US010417704B2

(12) United States Patent
Searson et al.

(10) Patent No.: US 10,417,704 B2
(45) Date of Patent: Sep. 17, 2019

(54) SYSTEMS AND METHODS OF ASSISTED STRATEGY DESIGN

(71) Applicant: EXPERIAN TECHNOLOGY LTD., Nottingham (GB)

(72) Inventors: Paul A. Searson, Derbyshire (GB); Maria M. Hastings, Nottingham (GB)

(73) Assignee: Experian Technology Ltd., Nottingham (GB)

( * ) Notice: Subject to any disclaimer, the term of this patent is extended or adjusted under 35 U.S.C. 154(b) by 881 days.

(21) Appl. No.: 14/589,250

(22) Filed: Jan. 5, 2015

(65) Prior Publication Data
US 2015/0278944 A1 Oct. 1, 2015

Related U.S. Application Data

(63) Continuation of application No. 13/287,050, filed on Nov. 1, 2011, now Pat. No. 8,930,262.
(Continued)

(51) Int. Cl.
G06Q 40/00 (2012.01)
G06Q 40/02 (2012.01)
(Continued)

(52) U.S. Cl.
CPC .......... G06Q 40/025 (2013.01); G06N 5/045 (2013.01); G06N 20/00 (2019.01); G06Q 10/10 (2013.01); G06Q 40/02 (2013.01)

(58) Field of Classification Search
CPC ...... G06Q 40/02; G06Q 40/10; G06Q 40/025; G06N 20/00; G06N 5/045
(Continued)

(56) References Cited

U.S. PATENT DOCUMENTS 3,316,395 A 4/1967 Lavin et al.
4,346,442 A 8/1982 Musmanno
(Continued)

FOREIGN PATENT DOCUMENTS

CN 101452555 6/2009
CN 102096886 6/2011
(Continued)

OTHER PUBLICATIONS

"ACS Company Birch & Davis Wins Texas CHIP Contract," PR Newswire, Section: Financial News, May 17, 2000, Dallas, TX, pp. 3.
(Continued)

Primary Examiner — Hai Tran
(74) Attorney, Agent, or Firm — Knobbe Martens Olson & Bear LLP

(57) ABSTRACT

In an embodiment, a computer system performs a method of modifying a decision algorithm, such as an algorithm for assigning credit limits or other credit terms, via a graphical user interface. The system displays a graphical representation of a decision tree comprising a plurality of decision nodes. The decision nodes are associated with respective conditions, and at least a portion of the decision nodes are associated with an outcome to be assigned to an individual matching the associated respective conditions in accordance with the decision tree. The system receives a selection of a decision node and selects a parameter to be used to construct subnodes of the selected decision node, and constructs the subnodes. The system calculates an outcome for each subnode, and it updates the graphical representation of the decision tree to include the plurality of subnodes.

12 Claims, 16 Drawing Sheets

Related U.S. Application Data

(60) Provisional application No. 61/409,220, filed on Nov. 2, 2010.

(51) Int. Cl.
   *G06Q 20/10* (2012.01)
   *G06N 20/00* (2019.01)
   *G06N 5/04* (2006.01)
   *G06Q 10/10* (2012.01)

(58) Field of Classification Search
   USPC .......................................................... 705/38
   See application file for complete search history.

(56) References Cited

U.S. PATENT DOCUMENTS

| | | |
|---|---|---|
| 4,491,725 A | 1/1985 | Pritchard |
| 4,774,664 A | 9/1988 | Campbell et al. |
| 4,812,628 A | 3/1989 | Boston et al. |
| 4,872,113 A | 10/1989 | Dinerstein |
| 4,891,503 A | 1/1990 | Jewell |
| 4,947,028 A | 8/1990 | Gorog |
| 5,201,010 A | 4/1993 | Deaton et al. |
| 5,239,462 A | 8/1993 | Jones et al. |
| 5,274,547 A | 12/1993 | Zoffel et al. |
| 5,301,105 A | 4/1994 | Cummings, Jr. |
| 5,454,030 A | 9/1995 | de Oliveira et al. |
| 5,500,513 A | 3/1996 | Langhans et al. |
| 5,504,675 A | 4/1996 | Cragun et al. |
| 5,557,514 A | 9/1996 | Seare et al. |
| 5,563,783 A | 10/1996 | Stolfo et al. |
| 5,583,760 A | 12/1996 | Klesse |
| 5,590,038 A | 12/1996 | Pitroda |
| 5,611,052 A | 3/1997 | Dykstra et al. |
| 5,640,577 A | 6/1997 | Scharmer |
| 5,644,778 A | 7/1997 | Burks et al. |
| 5,649,114 A | 7/1997 | Deaton et al. |
| 5,659,725 A | 8/1997 | Levy et al. |
| 5,696,907 A | 12/1997 | Tom |
| 5,699,527 A | 12/1997 | Davidson |
| 5,704,044 A | 12/1997 | Tarter et al. |
| 5,739,512 A | 4/1998 | Tognazzini |
| 5,745,654 A | 4/1998 | Titan |
| 5,754,632 A | 5/1998 | Smith |
| 5,754,939 A | 5/1998 | Herz et al. |
| 5,764,923 A | 6/1998 | Tallman et al. |
| 5,774,868 A | 6/1998 | Cragun et al. |
| 5,819,226 A | 10/1998 | Gopinathan et al. |
| 5,819,291 A | 10/1998 | Haimowitz et al. |
| 5,822,410 A | 10/1998 | McCausland et al. |
| 5,828,837 A | 10/1998 | Eikland |
| 5,832,068 A | 11/1998 | Smith |
| 5,832,447 A | 11/1998 | Rieker et al. |
| 5,842,211 A | 11/1998 | Horadan et al. |
| 5,844,218 A | 12/1998 | Kawan et al. |
| 5,870,721 A | 2/1999 | Norris |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,912,839 A | 6/1999 | Ovshinsky et al. |
| 5,924,082 A | 7/1999 | Silverman et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,014,632 A | 1/2000 | Gamble et al. |
| 6,018,723 A | 1/2000 | Siegel et al. |
| 6,021,397 A | 2/2000 | Jones et al. |
| 6,021,943 A | 2/2000 | Chastain |
| 6,029,139 A | 2/2000 | Cunningham et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,044,357 A | 3/2000 | Garg |
| 6,064,990 A | 5/2000 | Goldsmith |
| 6,067,522 A | 5/2000 | Warady et al. |
| 6,070,241 A | 5/2000 | Edwards et al. |
| 6,072,894 A | 6/2000 | Payne |
| 6,073,104 A | 6/2000 | Field |
| 6,073,106 A | 6/2000 | Rozen et al. |
| 6,088,686 A | 7/2000 | Walker et al. |
| 6,098,052 A | 8/2000 | Kosiba et al. |
| 6,108,641 A | 8/2000 | Kenna et al. |
| 6,119,103 A | 9/2000 | Basch et al. |
| 6,128,602 A | 10/2000 | Northington et al. |
| 6,129,273 A | 10/2000 | Shah |
| 6,144,948 A | 11/2000 | Walker et al. |
| 6,154,729 A | 11/2000 | Cannon et al. |
| 6,157,707 A | 12/2000 | Baulier et al. |
| 6,163,770 A | 12/2000 | Gamble et al. |
| 6,171,112 B1 | 1/2001 | Clark et al. |
| 6,182,229 B1 | 1/2001 | Nielsen |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,208,979 B1 | 3/2001 | Sinclair |
| 6,233,566 B1 | 5/2001 | Levine et al. |
| 6,236,977 B1 | 5/2001 | Verba et al. |
| 6,249,770 B1 | 6/2001 | Erwin et al. |
| 6,253,202 B1 | 6/2001 | Gilmour |
| 6,253,203 B1 | 6/2001 | O'Flaherty et al. |
| 6,263,447 B1 | 7/2001 | French et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin et al. |
| 6,311,169 B2 | 10/2001 | Duhon |
| 6,321,205 B1 | 11/2001 | Eder |
| 6,321,339 B1 | 11/2001 | French et al. |
| 6,324,524 B1 | 11/2001 | Lent et al. |
| 6,327,578 B1 | 12/2001 | Linehan |
| 6,330,546 B1 | 12/2001 | Gopinathan et al. |
| 6,343,279 B1 | 1/2002 | Bissonette et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,386,444 B1 | 5/2002 | Sullivan |
| 6,393,406 B1 | 5/2002 | Eder |
| 6,397,197 B1 | 5/2002 | Gindlesperger |
| 6,397,224 B1 | 5/2002 | Zubeldia et al. |
| 6,405,181 B2 | 6/2002 | Lent et al. |
| 6,422,462 B1 | 7/2002 | Cohen |
| 6,424,878 B1 | 7/2002 | Barker et al. |
| 6,424,956 B1 | 7/2002 | Werbos |
| 6,430,539 B1 | 8/2002 | Lazarus et al. |
| 6,453,297 B1 | 9/2002 | Burks et al. |
| 6,456,979 B1 | 9/2002 | Flagg |
| 6,456,983 B1 | 9/2002 | Keyes et al. |
| 6,463,533 B1 | 10/2002 | Calamera et al. |
| 6,496,827 B2 | 12/2002 | Kozam et al. |
| 6,496,936 B1 | 12/2002 | French et al. |
| 6,513,018 B1 | 1/2003 | Culhane |
| 6,523,021 B1 | 2/2003 | Monberg et al. |
| 6,532,450 B1 | 3/2003 | Brown et al. |
| 6,543,683 B2 | 4/2003 | Hoffman |
| 6,564,210 B1 | 5/2003 | Korda et al. |
| 6,581,059 B1 | 6/2003 | Barrett et al. |
| 6,587,841 B1 | 7/2003 | DeFrancesco |

(56) References Cited

U.S. PATENT DOCUMENTS

| | | |
|---|---|---|
| 6,598,030 B1 | 7/2003 | Siegel et al. |
| 6,601,173 B1 | 7/2003 | Mohler |
| 6,611,816 B2 | 8/2003 | Lebda et al. |
| 6,629,245 B1 | 9/2003 | Stone et al. |
| 6,647,383 B1 | 11/2003 | August et al. |
| 6,658,393 B1 | 12/2003 | Basch et al. |
| 6,684,093 B2 | 1/2004 | Kuth |
| 6,714,944 B1 | 3/2004 | Shapiro et al. |
| 6,734,886 B1 | 5/2004 | Hagan et al. |
| 6,745,938 B2 | 6/2004 | Sullivan |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,823,319 B1 | 11/2004 | Lynch et al. |
| 6,826,535 B2 | 11/2004 | Wood et al. |
| 6,836,764 B1 | 12/2004 | Hucal |
| 6,845,448 B1 | 1/2005 | Chaganti et al. |
| 6,847,942 B1 | 1/2005 | Land et al. |
| 6,857,073 B2 | 2/2005 | French et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,934,714 B2 | 8/2005 | Meinig |
| 6,950,807 B2 | 9/2005 | Brock |
| 6,950,858 B2 | 9/2005 | Ogami |
| 6,954,757 B2 | 10/2005 | Zargham et al. |
| 6,959,281 B1 | 10/2005 | Freeling et al. |
| 6,968,319 B1 | 11/2005 | Remington et al. |
| 6,983,379 B1 | 1/2006 | Spalink et al. |
| 6,985,887 B1 | 1/2006 | Sunstein et al. |
| 6,988,085 B2 | 1/2006 | Hedy |
| 6,999,941 B1 | 2/2006 | Agarwal |
| 7,003,491 B2 | 2/2006 | Starkman |
| 7,028,052 B2 | 4/2006 | Chapman et al. |
| 7,039,607 B2 | 5/2006 | Watarai et al. |
| 7,058,817 B1 | 6/2006 | Ellmore |
| 7,059,531 B2 | 6/2006 | Beenau et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,107,241 B1 | 9/2006 | Pinto |
| 7,120,599 B2 | 10/2006 | Keyes |
| 7,121,471 B2 | 10/2006 | Beenau et al. |
| 7,124,144 B2 | 10/2006 | Christianson et al. |
| 7,133,840 B1 | 11/2006 | Kenna et al. |
| 7,133,935 B2 | 11/2006 | Hedy |
| 7,154,375 B2 | 12/2006 | Beenau et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,188,169 B2 | 3/2007 | Buus et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,206,768 B1 | 4/2007 | deGroeve et al. |
| 7,212,995 B2 | 5/2007 | Schulkins |
| 7,234,156 B2 | 6/2007 | French et al. |
| 7,234,160 B2 | 6/2007 | Vogel et al. |
| 7,236,950 B2 | 6/2007 | Savage et al. |
| 7,240,059 B2 | 7/2007 | Bayliss et al. |
| 7,246,067 B2 | 7/2007 | Austin et al. |
| 7,246,068 B2 | 7/2007 | Thomas, Jr. |
| 7,249,076 B1 | 7/2007 | Pendleton et al. |
| 7,249,113 B1 | 7/2007 | Continelli et al. |
| 7,251,625 B2 | 7/2007 | Anglum |
| 7,263,497 B1 | 8/2007 | Wiser et al. |
| 7,275,083 B1 | 9/2007 | Seibel et al. |
| 7,277,869 B2 | 10/2007 | Starkman |
| 7,281,652 B2 | 10/2007 | Foss |
| 7,289,971 B1 | 10/2007 | O'Neil et al. |
| 7,295,988 B1 | 11/2007 | Reeves |
| 7,298,872 B2 | 11/2007 | Glisson |
| 7,302,420 B2 | 11/2007 | Aggarwal et al. |
| 7,303,120 B2 | 12/2007 | Beenau et al. |
| 7,305,359 B2 | 12/2007 | Bonnell |
| 7,310,617 B1 | 12/2007 | Cunningham |
| 7,313,538 B2 | 12/2007 | Wilmes et al. |
| 7,314,166 B2 | 1/2008 | Anderson et al. |
| 7,318,224 B2 | 1/2008 | Honarvar et al. |
| 7,328,276 B2 | 2/2008 | Alisuag |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,343,295 B2 | 3/2008 | Pomerance |
| 7,346,576 B2 | 3/2008 | Lent et al. |
| 7,356,516 B2 | 4/2008 | Richey et al. |
| 7,366,694 B2 | 4/2008 | Lazerson |
| 7,370,044 B2 | 5/2008 | Mulhern et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,988 B2 | 6/2008 | Slonecker, Jr. |
| 7,392,203 B2 | 6/2008 | Edison et al. |
| 7,392,216 B1 | 6/2008 | Palmgren et al. |
| 7,392,221 B2 | 6/2008 | Nabe et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,428,509 B2 | 9/2008 | Klebanoff |
| 7,433,864 B2 | 10/2008 | Malik |
| 7,444,302 B2 | 10/2008 | Hu et al. |
| 7,451,095 B1 | 11/2008 | Bradley et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,472,088 B2 | 12/2008 | Taylor et al. |
| 7,478,157 B2 | 1/2009 | Bohrer et al. |
| 7,479,949 B2 | 1/2009 | Jobs et al. |
| 7,490,356 B2 | 2/2009 | Lieblich et al. |
| 7,505,939 B2 | 3/2009 | Lent et al. |
| 7,527,967 B2 | 5/2009 | Chao et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,552,086 B1 | 6/2009 | Rajasekar et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,139 B1 | 8/2009 | Giordano et al. |
| 7,580,856 B1 | 8/2009 | Pliha |
| 7,584,127 B2 | 9/2009 | Byrne et al. |
| 7,584,146 B1 | 9/2009 | Duhon |
| 7,587,366 B2 | 9/2009 | Grim, III et al. |
| 7,590,589 B2 | 9/2009 | Hoffberg |
| 7,593,889 B2 | 9/2009 | Raines et al. |
| 7,593,891 B2 | 9/2009 | Kornegay et al. |
| 7,593,893 B1 | 9/2009 | Ladd et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1* | 10/2009 | Kornegay ............ G06Q 20/102 705/35 |
| 7,610,257 B1 | 10/2009 | Abrahams |
| 7,617,116 B2 | 11/2009 | Amar et al. |
| 7,630,932 B2 | 12/2009 | Danaher et al. |
| 7,630,933 B2 | 12/2009 | Peterson et al. |
| 7,640,200 B2 | 12/2009 | Gardner et al. |
| 7,647,274 B2 | 1/2010 | Peterson et al. |

(56) References Cited

U.S. PATENT DOCUMENTS

| | | |
|---|---|---|
| 7,647,344 B2 | 1/2010 | Skurtovich, Jr. et al. |
| 7,653,592 B1 | 1/2010 | Flaxman et al. |
| 7,668,769 B2 | 2/2010 | Baker et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,676,410 B2 | 3/2010 | Petralia |
| 7,676,418 B1 | 3/2010 | Chung et al. |
| 7,686,214 B1 | 3/2010 | Shao et al. |
| 7,689,494 B2 | 3/2010 | Torre et al. |
| 7,689,505 B2 | 3/2010 | Kasower |
| 7,689,506 B2 | 3/2010 | Fei et al. |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,102 B2 | 4/2010 | Rothstein |
| 7,711,635 B2 | 5/2010 | Steele et al. |
| 7,711,636 B2 | 5/2010 | Robida et al. |
| 7,720,750 B2 | 5/2010 | Brody |
| 7,725,385 B2 | 5/2010 | Royer et al. |
| 7,729,959 B1 | 6/2010 | Wells et al. |
| 7,739,139 B2 | 6/2010 | Robertson et al. |
| 7,747,559 B2 | 6/2010 | Leitner et al. |
| 7,756,789 B2 | 7/2010 | Welker et al. |
| 7,761,379 B2 | 7/2010 | Zoldi et al. |
| 7,765,148 B2 | 7/2010 | German et al. |
| 7,765,311 B2 | 7/2010 | Itabashi et al. |
| 7,769,696 B2 | 8/2010 | Yoda |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,147 B2 | 8/2010 | Haggerty et al. |
| 7,792,715 B1 | 9/2010 | Kasower |
| 7,793,835 B1 | 9/2010 | Coggeshall et al. |
| 7,797,725 B2 | 9/2010 | Lunt et al. |
| 7,801,812 B2 | 9/2010 | Conlin et al. |
| 7,805,345 B2 | 9/2010 | Abrahams et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,386 B2 | 12/2010 | Hazlehurst et al. |
| 7,860,786 B2 | 12/2010 | Blackburn et al. |
| 7,870,078 B2 | 1/2011 | Clark et al. |
| 7,877,304 B1 | 1/2011 | Coulter |
| 7,877,320 B1 | 1/2011 | Downey |
| 7,880,728 B2 | 2/2011 | de los Reyes et al. |
| 7,890,420 B2 | 2/2011 | Haggerty et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,962,404 B1 | 6/2011 | Metzger, II et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,979,908 B2 | 7/2011 | Millwee |
| 7,983,976 B2 | 7/2011 | Nafeh et al. |
| 7,983,979 B2 | 7/2011 | Holland, IV |
| 7,991,689 B1 | 8/2011 | Brunzell et al. |
| 8,001,034 B2 | 8/2011 | Chung et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,015,107 B2 | 9/2011 | Kornegay et al. |
| 8,032,932 B2 | 10/2011 | Speyer et al. |
| 8,036,979 B1 | 10/2011 | Torrez et al. |
| 8,055,579 B2 | 11/2011 | Davies et al. |
| 8,060,424 B2 | 11/2011 | Kasower |
| 8,065,233 B2 | 11/2011 | Lee et al. |
| 8,065,234 B2 | 11/2011 | Liao et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,086,524 B1 | 12/2011 | Craig et al. |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,104,679 B2 | 1/2012 | Brown |
| 8,126,805 B2 | 2/2012 | Sulkowski et al. |
| 8,127,982 B1 | 3/2012 | Casey et al. |
| 8,127,986 B1 | 3/2012 | Taylor et al. |
| 8,131,614 B2 | 3/2012 | Haggerty et al. |
| 8,131,685 B1 | 3/2012 | Gedalius et al. |
| 8,135,642 B1 | 3/2012 | Krause |
| 8,160,960 B1 | 4/2012 | Fei et al. |
| 8,185,408 B2 | 5/2012 | Baldwin, Jr. et al. |
| 8,190,511 B2 | 5/2012 | Erickson |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,214,238 B1 | 7/2012 | Fairfield et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,285,656 B1 | 10/2012 | Chang et al. |
| 8,290,840 B2 | 10/2012 | Kasower |
| 8,296,229 B1 | 10/2012 | Yellin et al. |
| 8,312,033 B1 | 11/2012 | McMillan |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,326,672 B2 | 12/2012 | Haggerty et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,380,618 B1 | 2/2013 | Kazenas et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B1 | 4/2013 | Keithley et al. |
| 8,442,886 B1 | 5/2013 | Haggerty et al. |
| 8,452,611 B1 | 5/2013 | Johnson et al. |
| 8,458,062 B2 | 6/2013 | Dutt et al. |
| 8,458,074 B2 | 6/2013 | Showalter |
| 8,464,939 B1 | 6/2013 | Taylor et al. |
| 8,473,354 B2 | 6/2013 | Psota et al. |
| 8,489,502 B2 | 7/2013 | Morris et al. |

(56) References Cited

U.S. PATENT DOCUMENTS

| | | |
|---|---|---|
| 8,515,844 B2 | 8/2013 | Kasower |
| 8,533,118 B2 | 9/2013 | Weller et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,589,069 B1 | 11/2013 | Lehman |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,621,562 B2 | 12/2013 | Antell et al. |
| 8,626,618 B2 | 1/2014 | Psota et al. |
| 8,626,646 B2 | 1/2014 | Torrez et al. |
| 8,630,929 B2 | 1/2014 | Haggerty et al. |
| 8,631,242 B2 | 1/2014 | Britti et al. |
| 8,639,616 B1 | 1/2014 | Rolenaitis et al. |
| 8,646,101 B1 | 2/2014 | Millwee |
| 8,650,407 B2 | 2/2014 | Britti et al. |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,719,159 B2 | 5/2014 | Keithley |
| 8,725,613 B1 | 5/2014 | Celka et al. |
| 8,738,516 B1 | 5/2014 | Dean et al. |
| 8,744,956 B1 | 6/2014 | DiChiara et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,806,218 B2 | 8/2014 | Hatakeda |
| 8,856,894 B1 | 10/2014 | Dean et al. |
| 8,930,216 B1 | 1/2015 | Johnson et al. |
| 8,930,251 B2 | 1/2015 | DeBie |
| 8,930,262 B1 | 1/2015 | Searson et al. |
| 8,930,263 B1 | 1/2015 | Mahacek et al. |
| 8,931,058 B2 | 1/2015 | DiChiara et al. |
| 8,949,981 B1 | 2/2015 | Trollope et al. |
| 9,043,930 B2 | 5/2015 | Britti et al. |
| 9,058,627 B1 | 6/2015 | Wasser et al. |
| 9,143,541 B1 | 9/2015 | Szamonek et al. |
| 9,147,042 B1 | 9/2015 | Haller et al. |
| 9,183,363 B1 | 11/2015 | Millwee |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,489,694 B2 | 11/2016 | Haller et al. |
| 9,553,936 B2 | 1/2017 | Dijk et al. |
| 9,652,802 B1 | 5/2017 | Kasower |
| 9,684,905 B1 | 6/2017 | Haller et al. |
| 9,697,263 B1 | 7/2017 | Girulat, Jr. |
| 9,710,523 B2 | 7/2017 | Skurtovich, Jr. et al. |
| 9,792,648 B1 | 10/2017 | Haller et al. |
| 2001/0011247 A1 | 8/2001 | O'Flaherty et al. |
| 2001/0014868 A1 | 8/2001 | Herz et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0037289 A1 | 11/2001 | Mayr et al. |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0023051 A1 | 2/2002 | Kunzle et al. |
| 2002/0026519 A1 | 2/2002 | Itabashi et al. |
| 2002/0042763 A1 | 4/2002 | Pillay et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0103680 A1 | 8/2002 | Newman |
| 2002/0107849 A1 | 8/2002 | Hickey et al. |
| 2002/0111816 A1 | 8/2002 | Lortscher et al. |
| 2002/0119824 A1 | 8/2002 | Allen |
| 2002/0128960 A1 | 9/2002 | Lambiotte et al. |
| 2002/0128962 A1 | 9/2002 | Kasower |
| 2002/0133365 A1 | 9/2002 | Grey et al. |
| 2002/0133503 A1 | 9/2002 | Amar et al. |
| 2002/0138297 A1 | 9/2002 | Lee |
| 2002/0138417 A1 | 9/2002 | Lawrence |
| 2002/0138470 A1 | 9/2002 | Zhou |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2002/0198806 A1 | 12/2002 | Blagg et al. |
| 2002/0198824 A1 | 12/2002 | Cook |
| 2003/0009418 A1 | 1/2003 | Green et al. |
| 2003/0014336 A1 | 1/2003 | Dao et al. |
| 2003/0018549 A1 | 1/2003 | Fei et al. |
| 2003/0028402 A1 | 2/2003 | Ulrich et al. |
| 2003/0033242 A1 | 2/2003 | Lynch et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0110111 A1 | 6/2003 | Nalebuff et al. |
| 2003/0120591 A1 | 6/2003 | Birkhead et al. |
| 2003/0144950 A1 | 7/2003 | O'Brien et al. |
| 2003/0154162 A1 | 8/2003 | Danaher et al. |
| 2003/0163416 A1 | 8/2003 | Kitajima |
| 2003/0163483 A1 | 8/2003 | Zingher et al. |
| 2003/0187768 A1 | 10/2003 | Ryan et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0216965 A1 | 11/2003 | Libman |
| 2003/0220858 A1 | 11/2003 | Lam et al. |
| 2003/0229507 A1 | 12/2003 | Perge |
| 2003/0229580 A1 | 12/2003 | Gass et al. |
| 2003/0233259 A1 | 12/2003 | Mistretta et al. |
| 2003/0233323 A1 | 12/2003 | Bilski et al. |
| 2003/0236738 A1 | 12/2003 | Lange et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0023637 A1 | 2/2004 | Johnson et al. |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0030667 A1 | 2/2004 | Xu et al. |

(56) References Cited

U.S. PATENT DOCUMENTS

| | | |
|---|---|---|
| 2004/0039688 A1 | 2/2004 | Sulkowski et al. |
| 2004/0044563 A1 | 3/2004 | Stein |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0103147 A1 | 5/2004 | Flesher et al. |
| 2004/0107125 A1 | 6/2004 | Guheen et al. |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0117235 A1 | 6/2004 | Shacham |
| 2004/0117302 A1 | 6/2004 | Weichert et al. |
| 2004/0128150 A1 | 7/2004 | Lundegren |
| 2004/0128230 A1 | 7/2004 | Oppenheimer et al. |
| 2004/0128236 A1 | 7/2004 | Brown et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |
| 2004/0143546 A1 | 7/2004 | Wood et al. |
| 2004/0153437 A1 | 8/2004 | Buchan |
| 2004/0153521 A1 | 8/2004 | Kogo |
| 2004/0158523 A1 | 8/2004 | Dort |
| 2004/0159700 A1 | 8/2004 | Khan et al. |
| 2004/0163101 A1 | 8/2004 | Swix |
| 2004/0167793 A1 | 8/2004 | Masuoka et al. |
| 2004/0177030 A1 | 9/2004 | Shoham |
| 2004/0177114 A1 | 9/2004 | Friedman et al. |
| 2004/0193538 A1 | 9/2004 | Raines |
| 2004/0199458 A1 | 10/2004 | Ho |
| 2004/0199462 A1 | 10/2004 | Starrs |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243506 A1 | 12/2004 | Das |
| 2004/0243588 A1 | 12/2004 | Tanner et al. |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0065874 A1 | 3/2005 | Lefner et al. |
| 2005/0071328 A1 | 3/2005 | Lawrence |
| 2005/0080821 A1 | 4/2005 | Breil et al. |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0125291 A1 | 6/2005 | Demkiw Grayson et al. |
| 2005/0125397 A1 | 6/2005 | Gross et al. |
| 2005/0137899 A1 | 6/2005 | Davies et al. |
| 2005/0137912 A1 | 6/2005 | Rao et al. |
| 2005/0144452 A1 | 6/2005 | Lynch et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0177489 A1 | 8/2005 | Neff et al. |
| 2005/0187860 A1 | 8/2005 | Peterson et al. |
| 2005/0197953 A1 | 9/2005 | Broadbent et al. |
| 2005/0197954 A1 | 9/2005 | Maitland et al. |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0251474 A1 | 11/2005 | Shinn et al. |
| 2005/0251820 A1 | 11/2005 | Stefanik et al. |
| 2005/0267840 A1 | 12/2005 | Holm-Blagg et al. |
| 2005/0273431 A1 | 12/2005 | Abel et al. |
| 2005/0279827 A1 | 12/2005 | Mascavage et al. |
| 2005/0288998 A1 | 12/2005 | Verma et al. |
| 2006/0004731 A1 | 1/2006 | Seibel et al. |
| 2006/0014129 A1 | 1/2006 | Coleman et al. |
| 2006/0015425 A1 | 1/2006 | Brooks |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0041443 A1 | 2/2006 | Horvath |
| 2006/0059073 A1 | 3/2006 | Walzak |
| 2006/0059086 A1 | 3/2006 | Mulhern |
| 2006/0069635 A1 | 3/2006 | Ram et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0122921 A1 | 6/2006 | Comerford et al. |
| 2006/0123461 A1 | 6/2006 | Lunt et al. |
| 2006/0155573 A1 | 7/2006 | Hartunian |
| 2006/0155639 A1 | 7/2006 | Lynch et al. |
| 2006/0173772 A1 | 8/2006 | Hayes et al. |
| 2006/0177226 A1 | 8/2006 | Ellis, III |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0202012 A1 | 9/2006 | Grano et al. |
| 2006/0204051 A1 | 9/2006 | Holland, IV |
| 2006/0206416 A1 | 9/2006 | Farias |
| 2006/0212407 A1 | 9/2006 | Lyon |
| 2006/0218079 A1 | 9/2006 | Goldblatt et al. |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0242046 A1 | 10/2006 | Haggerty et al. |
| 2006/0242050 A1 | 10/2006 | Haggerty et al. |
| 2006/0247947 A1 | 11/2006 | Suringa |
| 2006/0247991 A1 | 11/2006 | Jin et al. |
| 2006/0271457 A1 | 11/2006 | Romain et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |

(56) References Cited

U.S. PATENT DOCUMENTS

| | | |
|---|---|---|
| 2006/0288090 A1 | 12/2006 | Kraft |
| 2006/0294199 A1 | 12/2006 | Bertholf |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016520 A1 | 1/2007 | Gang et al. |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0027791 A1 | 2/2007 | Young et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0067207 A1 | 3/2007 | Haggerty et al. |
| 2007/0067297 A1 | 3/2007 | Kublickis |
| 2007/0078741 A1 | 4/2007 | Haggerty et al. |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0106582 A1 | 5/2007 | Baker et al. |
| 2007/0112668 A1 | 5/2007 | Celano et al. |
| 2007/0118410 A1 | 5/2007 | Nadai |
| 2007/0124235 A1 | 5/2007 | Chakraborty et al. |
| 2007/0127702 A1 | 6/2007 | Shaffer et al. |
| 2007/0130070 A1 | 6/2007 | Williams |
| 2007/0156692 A1 | 7/2007 | Rosewarne |
| 2007/0162414 A1 | 7/2007 | Horowitz et al. |
| 2007/0174122 A1 | 7/2007 | Howard et al. |
| 2007/0192121 A1 | 8/2007 | Routson et al. |
| 2007/0192122 A1 | 8/2007 | Routson et al. |
| 2007/0192165 A1 | 8/2007 | Haggerty et al. |
| 2007/0192347 A1 | 8/2007 | Rossmark et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0214005 A1 | 9/2007 | Kennedy |
| 2007/0214076 A1* | 9/2007 | Robida ............... G06Q 20/10 705/38 |
| 2007/0226047 A1 | 9/2007 | Ward |
| 2007/0226093 A1 | 9/2007 | Chan et al. |
| 2007/0244732 A1 | 10/2007 | Chatterji et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0261114 A1 | 11/2007 | Pomerantsev |
| 2007/0262137 A1 | 11/2007 | Brown |
| 2007/0266439 A1 | 11/2007 | Kraft |
| 2007/0271178 A1 | 11/2007 | Davis et al. |
| 2007/0279187 A1 | 12/2007 | Hekmatpour et al. |
| 2007/0282730 A1 | 12/2007 | Carpenter et al. |
| 2007/0282736 A1 | 12/2007 | Conlin et al. |
| 2007/0284433 A1 | 12/2007 | Domenica et al. |
| 2007/0288271 A1 | 12/2007 | Klinkhammer |
| 2007/0288360 A1 | 12/2007 | Seeklus |
| 2007/0294126 A1 | 12/2007 | Maggio |
| 2007/0294163 A1 | 12/2007 | Harmon et al. |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2008/0010203 A1 | 1/2008 | Grant |
| 2008/0010206 A1 | 1/2008 | Coleman |
| 2008/0015954 A1 | 1/2008 | Huber et al. |
| 2008/0015979 A1 | 1/2008 | Bentley |
| 2008/0021802 A1 | 1/2008 | Pendleton |
| 2008/0022281 A1 | 1/2008 | Dubhashi et al. |
| 2008/0033742 A1 | 2/2008 | Bernasconi |
| 2008/0046351 A1 | 2/2008 | Wiener et al. |
| 2008/0052182 A1 | 2/2008 | Marshall |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0120155 A1 | 5/2008 | Pliha |
| 2008/0133278 A1 | 6/2008 | Stanfield |
| 2008/0133322 A1 | 6/2008 | Kalia et al. |
| 2008/0133325 A1 | 6/2008 | De et al. |
| 2008/0140507 A1 | 6/2008 | Hamlisch et al. |
| 2008/0147523 A1 | 6/2008 | Mulry et al. |
| 2008/0162383 A1 | 7/2008 | Kraft |
| 2008/0172324 A1 | 7/2008 | Johnson |
| 2008/0177655 A1 | 7/2008 | Zalik |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205655 A1 | 8/2008 | Wilkins et al. |
| 2008/0208610 A1 | 8/2008 | Thomas et al. |
| 2008/0208726 A1 | 8/2008 | Tsantes et al. |
| 2008/0208873 A1 | 8/2008 | Boehmer |
| 2008/0215470 A1 | 9/2008 | Sengupta et al. |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228635 A1 | 9/2008 | Megdal et al. |
| 2008/0255897 A1 | 10/2008 | Megdal et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0294546 A1 | 11/2008 | Flannery |
| 2008/0301016 A1 | 12/2008 | Durvasula et al. |
| 2008/0306750 A1 | 12/2008 | Wunder et al. |
| 2008/0319832 A1 | 12/2008 | Liebe |
| 2008/0319889 A1 | 12/2008 | Hammad |
| 2008/0319895 A1 | 12/2008 | Lazerson |
| 2009/0006185 A1 | 1/2009 | Stinson |
| 2009/0012889 A1 | 1/2009 | Finch |
| 2009/0018996 A1 | 1/2009 | Hunt et al. |
| 2009/0024428 A1 | 1/2009 | Hudock, Jr. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0089205 A1 | 4/2009 | Bayne |
| 2009/0094674 A1 | 4/2009 | Schwartz et al. |
| 2009/0099960 A1 | 4/2009 | Robida et al. |
| 2009/0112650 A1 | 4/2009 | Iwane |
| 2009/0119199 A1 | 5/2009 | Salahi |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0177480 A1 | 7/2009 | Chen et al. |
| 2009/0222308 A1 | 9/2009 | Zoldi et al. |
| 2009/0222379 A1 | 9/2009 | Choudhuri et al. |
| 2009/0222380 A1 | 9/2009 | Choudhuri et al. |

(56) References Cited

U.S. PATENT DOCUMENTS

| | | |
|---|---|---|
| 2009/0234775 A1 | 9/2009 | Whitney et al. |
| 2009/0240609 A1 | 9/2009 | Cho et al. |
| 2009/0240624 A1 | 9/2009 | James et al. |
| 2009/0248573 A1 | 10/2009 | Haggerty et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0313163 A1 | 12/2009 | Wang et al. |
| 2009/0327120 A1 | 12/2009 | Eze et al. |
| 2009/0328173 A1 | 12/2009 | Jakobson et al. |
| 2010/0009320 A1 | 1/2010 | Wilkelis |
| 2010/0009663 A1 | 1/2010 | Chang |
| 2010/0011428 A1 | 1/2010 | Atwood et al. |
| 2010/0017300 A1 | 1/2010 | Bramlage et al. |
| 2010/0023434 A1 | 1/2010 | Bond |
| 2010/0023448 A1 | 1/2010 | Eze |
| 2010/0030649 A1 | 2/2010 | Ubelhor |
| 2010/0030677 A1 | 2/2010 | Melik-Aslanian et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0174638 A1 | 7/2010 | Debie et al. |
| 2010/0185546 A1 | 7/2010 | Pollard |
| 2010/0188684 A1 | 7/2010 | Kumara |
| 2010/0205087 A1 | 8/2010 | Hubler et al. |
| 2010/0217837 A1 | 8/2010 | Ansari et al. |
| 2010/0228657 A1 | 9/2010 | Kagarlis |
| 2010/0228658 A1 | 9/2010 | Ketelsen et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0293090 A1 | 11/2010 | Domenikos et al. |
| 2010/0293114 A1 | 11/2010 | Khan et al. |
| 2010/0299262 A1 | 11/2010 | Handler |
| 2011/0016042 A1 | 1/2011 | Cho et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0078073 A1 | 3/2011 | Annappindi et al. |
| 2011/0126275 A1 | 5/2011 | Anderson et al. |
| 2011/0131123 A1 | 6/2011 | Griffin et al. |
| 2011/0161218 A1 | 6/2011 | Swift |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0213641 A1 | 9/2011 | Metzger, II et al. |
| 2011/0218826 A1 | 9/2011 | Birtel et al. |
| 2011/0238566 A1 | 9/2011 | Santos |
| 2011/0270779 A1 | 11/2011 | Showalter |
| 2011/0270925 A1 | 11/2011 | Mina |
| 2012/0005070 A1 | 1/2012 | McFall et al. |
| 2012/0023011 A1 | 1/2012 | Hurwitz |
| 2012/0029956 A1 | 2/2012 | Ghosh et al. |
| 2012/0030771 A1 | 2/2012 | Pierson et al. |
| 2012/0066065 A1 | 3/2012 | Switzer |
| 2012/0066084 A1 | 3/2012 | Sneyders |
| 2012/0072464 A1 | 3/2012 | Cohen |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0116950 A1 | 5/2012 | Torrez et al. |
| 2012/0123942 A1 | 5/2012 | Song et al. |
| 2012/0136763 A1 | 5/2012 | Megdal et al. |
| 2012/0136774 A1 | 5/2012 | Imrey et al. |
| 2012/0150587 A1 | 6/2012 | Kruger et al. |
| 2012/0158574 A1 | 6/2012 | Brunzell et al. |
| 2012/0158654 A1 | 6/2012 | Behren et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0215682 A1 | 8/2012 | Lent et al. |
| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0278767 A1 | 11/2012 | Stibel et al. |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2013/0006825 A1 | 1/2013 | Robida et al. |
| 2013/0018811 A1 | 1/2013 | Britti et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0080315 A1 | 3/2013 | Torrez et al. |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0151388 A1 | 6/2013 | Falkenborg et al. |
| 2013/0173449 A1 | 7/2013 | Ng et al. |
| 2013/0173450 A1 | 7/2013 | Celka et al. |
| 2013/0173451 A1 | 7/2013 | Kornegay et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0268357 A1 | 10/2013 | Heath |
| 2013/0332338 A1 | 12/2013 | Yan et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0095251 A1 | 4/2014 | Huovilainen |
| 2014/0110477 A1 | 4/2014 | Hammad |
| 2014/0136422 A1 | 5/2014 | Jung et al. |
| 2014/0156500 A1 | 6/2014 | Lassen et al. |
| 2014/0156503 A1 | 6/2014 | Lassen et al. |
| 2014/0157375 A1 | 6/2014 | Britti et al. |
| 2014/0244353 A1 | 8/2014 | Winters |
| 2014/0258083 A1 | 9/2014 | Achanta et al. |
| 2014/0279329 A1 | 9/2014 | Dancel |
| 2015/0026039 A1 | 1/2015 | Annappindi |
| 2015/0269506 A1 | 9/2015 | Britti et al. |
| 2015/0295906 A1 | 10/2015 | Ufford et al. |
| 2015/0310543 A1 | 10/2015 | DeBie |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2017/0200223 A1 | 7/2017 | Kasower |
| 2017/0278182 A1 | 9/2017 | Kasower |

FOREIGN PATENT DOCUMENTS

| | | |
|---|---|---|
| CN | 102663650 | 9/2012 |
| DE | 91 08 341 | 10/1991 |
| EP | 0 554 083 | 8/1993 |
| EP | 0 919 942 | 6/1999 |
| EP | 1 028 401 | 8/2000 |
| EP | 1 122 664 | 8/2001 |
| EP | 1 988 501 | 11/2008 |
| GB | 1 322 809 | 7/1973 |
| KR | 10-2004-0078798 | 9/2004 |
| KR | 10-2013-0107394 | 10/2013 |

(56) References Cited

FOREIGN PATENT DOCUMENTS

| | | |
|---|---|---|
| RU | 2 181 216 | 4/2002 |
| WO | WO 94/006103 | 3/1994 |
| WO | WO 94/012943 | 6/1994 |
| WO | WO 95/012857 | 5/1995 |
| WO | WO 99/004350 | 1/1999 |
| WO | WO 99/046710 | 9/1999 |
| WO | WO 00/055778 | 9/2000 |
| WO | WO 00/055789 | 9/2000 |
| WO | WO 00/055790 | 9/2000 |
| WO | WO 00/065469 | 11/2000 |
| WO | WO 01/004821 | 1/2001 |
| WO | WO 01/011522 | 2/2001 |
| WO | WO 01/039589 | 6/2001 |
| WO | WO 01/041355 | 6/2001 |
| WO | WO 01/075754 | 10/2001 |
| WO | WO 01/084281 | 11/2001 |
| WO | WO 02/013047 | 2/2002 |
| WO | WO 03/101123 | 12/2003 |
| WO | WO 2004/114160 | 12/2004 |
| WO | WO 2005/022348 | 3/2005 |
| WO | WO 2005/124619 | 12/2005 |
| WO | WO 2006/099081 | 9/2006 |
| WO | WO 2007/004158 | 1/2007 |
| WO | WO 2007/106786 | 9/2007 |
| WO | WO 2007/106787 | 9/2007 |
| WO | WO 2007/149941 | 12/2007 |
| WO | WO 2008/021061 | 2/2008 |
| WO | WO 2008/147918 | 12/2008 |
| WO | WO 2009/099448 | 8/2009 |
| WO | WO 2009/117468 | 9/2009 |
| WO | WO 2009/132114 | 10/2009 |
| WO | WO 2013/009920 | 1/2013 |
| WO | WO 2014/088895 | 6/2014 |
| WO | WO 2014/137759 | 9/2014 |

OTHER PUBLICATIONS

"An Even Better Solution to Financing Elective Surgery . . .", Unicorn Financial, pp. 7, http://web.archive.org/web/20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
An Expert System for Determining Medicaid Eligibility, Journal of Medical Systems, vol. 12, Nov. 5, 1988, in 10 pages.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr PH.D., et al., "Utility Payments as Alternative Credit Data: A Reality Check", Asset Builders of America, Inc., Oct. 5, 2006, pp. 1-18, Washington, D.C.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Cheney, Karen, "Fix Your Nose, If You Wish, But Not With This New Loan," Money Magazine, vol. 27, No. 5, 1 pg., dated May 1, 1998.
CreditToolkit, Digital Matrix Systems, as printed out Mar. 4, 2008, pp. 2.
"Debt Settlement: Watch Video on how to Pay Your Debt Faster", http://www.debtconsolidationcare.com/debt-settlement.html printed Jan. 9, 2013 in 6 pages.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Dietz, Ellen, "Dental Office Management," 8 pgs., pp. 316-321, Copyright 2000.
eFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Experian, Custom Strategist and Qualifile from Funds, 2000, in 2 pages.
Felsenthal, Edward, "Health Costs; Managed Care Helps Curb Costs, Study Says," The Wall Street Journal, dated Aug. 12, 1991.
"Financing Medical Procedures a Lucrative But Risky Business," Credit Risk Management Report, vol. 10, Issue 15, 2 pgs., dated Aug. 7, 2000.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc...
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Henry, M.D., Kimberly A., "The Face-Lift Sourcebook," copyright 2000, 3 pgs. (p. 207).
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
IndiCareTM, On-Line Patient Assistant Program, Website Users Manual, JBI Associates, LLC, 1997.
Kent, Heather, "Huge declines in price as competition heats up in Vancouver's booming laser-surgery market," CMAJ, Oct. 5, 1999; 161 (7), pp. 857-858.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
Mathematica Policy Research, Inc., "1998 Health Care Survey of DoD Beneficiaries: Technical Manual," Jul. 1999.
McGovern, Celeste, "Jayhawk Medical Acceptance" (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
MediCredit Announces Major Investment from Medstone; Financing Will Enable Dramatic Expansion of Online Services, Business Wire, p. 2, dated May 12, 2000.

(56) References Cited

OTHER PUBLICATIONS

MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
NewsRoom, "CIGNA Report Withdrawn as Foe Sees Opening," Insurance Regulator, State Survey, Sep. 9, 1996, vol. 8, Issue 34, pp. 4.
Next Card: About Us, http://web.cba.neu.edu/~awatson/NextCardCase/NextCardAboutUs.htm printed Oct. 23, 2009 in 10 pages.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
"Qualifying for Debt Settlement", http://www.certifieddebt.com/debt/settlement-qualifications.shtml printed Jan. 9, 2013 in 2 pages.
RAP Interactive, Inc. and Web Decisions: Proudly Presents Live Decisions, A Powerful New Information and Technology Resource that Revolutionizes Interactive Marketing, downloaded from www.webdecisons.com/pdf/LiveDecisions_Bro.pdf, as printed on Aug. 13, 2007.
"Resolve Debt for Less: With Help from Freedom Financial" http://www.debtsettlementusa.com/ printed Jan. 9, 2013 in 6 pages.
Rubin, Rita, "Cosmetic Surgery on Credit, Finance plans let patients reconstruct now, pay later," The Dallas Morning News, 2 pgs., dated Sep. 10, 1988.
SearchAmerica, "Payment Advisor Suite TM", Solutions, 2009, pp. 2.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
"Settling Your Debts—Part 1 in Our Debt Settlement Series", http://www.creditinfocenter.com/debt/settle_debts.shtml printed Jan. 9, 2013 in 6 pages.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thomas, David, "Report on Networks and Electronic Communications Newcourt Credit Turns to Extranet Services / A PC Connects to 1,200 Users at Once", The Globe and Mail (Canada), Section: Report on Business Special Report, Nov. 12, 1996, pp. 2.
Washington State Office of Public Defense, "Criteria and Standards for Determining and Verifying Indigency," dated Feb. 9, 2001.
Webpage printed from http://www.magnum.net/pdfs/RapUpBrochure.pdf as printed Mar. 3, 2008.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Zoot—Decision Engine, www.zootweb.com/decision_engine.html, as printed on Mar. 3, 2008.
Zoot—Pre-Built Standard Attributes, www.zootweb.com/credit_attributes.html as printed Mar. 3, 2008.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, p. 8, 2006.
Agreement Between Dallas Computer Services, dba DCS Information Systems and the Texas Department of Human Services, to Provide Data Brokering Services, Contract #324Z-8-05203 signed Jun. 15, 1998 and including corresponding documents in 38 pages. [Search America—Exhibit 1010].
Aharony et al., "Social Area Networks: Data Networking of the People, by the People, for the People," 2009 International Conference on Computational Science and Engineering, May 2009, pp. 1148-1155.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Awoonor-Williams, Princess Josephine, Ph.D. "Gender and Credit: An Analysis of Women's Experience in the Credit Market", ProQuest Dissertations and Theses, 2004, pp. 148.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
Bilotta, Caryn, "Understanding Credit Scores," Pittsburgh Post—Gazette, May 9, 2010.
"Bust-Out Schemes", Visual Analytics Inc. Technical Product Support, Newsletter vol. 4, Issue 1, Jan. 2005, pp. 7.
Butkus, Charles, "System Cuts Medicaid Processing to 11 Cents a Claim", ComputerWorld, May 21, 1975, pp. 51 and 53.
"Charity Care Policy and Procedure", Report to the Community for the Year 2002, John T. Mather Memorial Hospital, Port Jefferson, NY, 2002.
CreditAnalyst, Digital Matrix Systems, as printed out Mar. 4, 2008, pp. 2.
CreditSesame; "FAQs"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
"Credit Information Bureaus and 'CIBIL'", http://www.icicibank.com/cibil.html printed Aug. 22, 2012 in 3 pages.
Compliance Data Systems, Inc. T-Pass Catalogue Profile, Sep. 8, 1994, available at http://www.compliancedata.com/catalogue.html.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Current System Architecture and Functional Specifications", TDHS System, Jul. 3, 2000.
Curriculum Vitae of Kenneth A. Zeger dated Jan. 8, 2013 in 20 pages.
"D&B Corporate Family Linkage", D&B Internet Access for U.S. Contract Customers, https://www.dnb.com/ecomp/help/linkage.htm as printed Dec. 17, 2009, p. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.

(56) References Cited

OTHER PUBLICATIONS

DiBartolomeo, Dan, "Portfolio Optimization: The Robust Solution," Prudential Securities Quantitative Conference, Dec. 21, 1993, pp. 8.
Downes et al., Dictionary of Finance and Investment Terms, Fifth Edition, 1998, pp. 332-333.
Downing, Jr.; Richard, "Changes to the Credit Reporting Act," Mortgage Banking, Apr. 1, 1998, vol. 58, No. 7, pp. 82-85.
Dymi, Amilda, Need for Leads Spurs Some Upgrades, Origination News—Special Report, May 1, 2008, vol. vol. 17, Issue No. 8, pp. p. 24, Atlanta, Copyright 2008 SourceMedia, Inc.
"Enterprise Technology Management Architecture", Texas Department of Human Services, Version 1.0, Aug. 31, 1999, pp. 22.
Equifax Consumer Credit Report http://www.equifax.com/home/, as retrieved on Sep. 17, 2008.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian Consumer Credit Report http://www.experian.com/, as retrieved on Sep. 17, 2008.
Experian—Scorex Announces New Credit Simulation Tool, PR Newswire, Costa Mesa, CA, Jun. 13, 2005.
Experian, "Enabling e-business", White Paper, Jan. 2001, pp. 21.
Experian, "Instant Prescreen: Offer preapproved credit at the point of sale", Oct. 2000, pp. 2, http://www.cdillinois.com/pdf_file/instant_prescreen_ps.pdf.
Experian, "Experian Rental Payment Data," http://www.experian.com/rentbureau/rental-data.html printed Nov. 22, 2013 in 2 pages.
"Factual Data Corp. Completes First Interface with Automated Underwriting System for Subprime Lenders", PR Newswire, Loveland, CO, Jan. 17, 2000.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com; "Identity Theft Protection for the Whole Family | FamilySecure.com" http://www.familysecure.com/, as retrieved on Nov. 5, 2009.
"Fictitious Business Name Records", Westlaw Database Directory, http://directory.westlaw.com/scope/default.asp?db=FBN-ALL&RS-W&VR=2.0 as printed Dec. 17, 2009, pp. 5.
"Fighting the New Face of Fraud", FinanceTech, http://www.financetech.com/showArticle.jhtml?ParticleID=167100405, Aug. 2, 2005.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
Frohlich, Robert M., Jr., "Credit Scoring in a Hospital Setting", University of North Florida Thesis, Paper 97, Apr. 1997, pp. 82.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pleasset.html, http://www.fundmanagersoftware.com/demo2.html.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Gualtieri et al., "The Forrester Wave™: Big Data Streaming Analytics, Q1 2016", Forrester®, Mar. 30, 2016, pp. 14, http://www.sas.com/content/dam/SAS/en_us/doc/analystreport/forrester-big-data-streaming-analytics-108218.pdf.
"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype=an&subtype=ca&htmlfid=897/ENUS297-476&appname=xldata&language=enus.
"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info02.html.
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
ID Analytics, "ID Analytics® Consumer Notification Service" printed Apr. 16, 2013 in 2 pages.
Ideon, Credit-Card Registry that Bellyflopped this Year, Is Drawing some Bottom-Fishers, The Wall Street Journal, Aug. 21, 1995, pp. C2.
"Implementation Advance Planning Document", Implementation Advance Planning Document, TIERS, Texas Department of Human Services, Eric M. Bost, Commissioner, May 2000, pp. 128.
Income and Eligibility Verification System (IEVS), Medi-Cal Eligibility Procedures Manual, Apr. 2000, pp. 164.
Instant Access to Credit Reports Now Available Online with DMS' CreditBrowser-based system also Simplifies Credit Decisioning and Offers a Central Point of Control, Business Wire, Dallas, May 23, 2000, p. 0264.
Jones, Sandra, "Small Software Firm Aiming for Internet", ChicagoBusiness.com, Mar. 13, 2000.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
Lamons, Bob, "Be Smart: Offer Inquiry Qualification Services," Marketing News, ABI/Inform Global, Nov. 6, 1995, vol. 29, No. 23, pp. 13.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Littwin, Angela, "Beyond Usury: A Study of Credit-Card Use and Preference Among Low-Income Consumers", Texas Law Review, vol. 86, No. 3, pp. 451-506; Feb. 2008.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.
Lund, Graham, "Credit Bureau Data: Maximizing the Benefits," Credit Management, May 2004, ProQuest Central, pp. 44-45.
Magid, Lawrence, J., "Business Tools: When Selecting an ASP Ensure Data Mobility", Los Angeles Times, Los Angeles, CA, Feb. 26, 2001, vol. C, Issue 4, pp. 3.
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539,html printed Nov. 22, 2013 in 2 pages.

(56) References Cited

OTHER PUBLICATIONS

Merriam Webster's Collegiate Dictionary, 10th Edition, 1999, p. 79.
MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Mint.com, http://www.mint.com/ printed Sep. 18, 2008 in 2 pages.
Mowll, Charles, "Setting a Credit Policy for Patient Accounts", Healthcare Financial Management, Jan. 1989, pp. 3.
Mowll, Charles, "Knowing How and When to Grant Credit Healthcare Organizations", Healthcare Financial Management, Feb. 1989, pp. 4.
MS Money Software by Microsoft http://www.microsoft.com/Money/default.mspx as retrieved on Sep. 17, 2008.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W&VR=2.0 as printed Dec. 17, 2009, pp. 5.
Network Sciences Website, Community Health and Social Services Information System (CHASSIS) and Medicaider software by Network Sciences, LLC, on sale and/or in public use in or around 2000, http://www.netsci.net/index.asp.
Newsom v. Vanderbilt University et al., Opinion, 453 F.Supp. 401 (1978), Jun. 1, 1978, pp. 24.
"New for Investors: Asset Allocation, Seasoned Returns and More," Prosper, http://blog.prosper.com/2011/10/27/new-for-investors-asset-allocation-seasoned-returns-and-more/, pp. 4.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, "Rethinking Regulation of Credit Rating Agencies: An Institutional Investor Perspective", Council of Institutional Investors, Apr. 2009, pp. 21.
"Patients May be Frauds", The Victoria Advocate, Victoria, Texas, 138th Year—No. 194, p. 10A, Nov. 17, 1983.
PC411, Inc. "Reverse Searching Now Available on PC411," http://web.archive.org/web/19961103061843/http://www/pc411.com/PR_Revrs.html Apr. 9, 1996 in 2 pages.
"Peter Martin Releases HelpWorks Web Edition", Business Wire, Chicago, Sep. 28, 1999.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
"PremierGuide Announces Release 3.0 of Local Search Platform", Business Wire, Mar. 4, 2004, Palo Alto, CA, p. 5574.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_gif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
RapUP, Attribute Management & Report Systems:Absolute Advantage!, Magnum Communications Brochure, Copyright 2004, pp. 5.
"Recognition and use by Appraisers of Energy-Performance Benchmarking Tools for Commercial Buildings," prepared by the Institute for Market Transformation, NYSERDA, Feb. 2003, pp. 6.
Repici et al., "The Comma Separated Value (CSV) File Format", http://creatvyst.com/Doc/Articles/CSV/CSV01.htm, Creativyst, Inc., 2002, pp. 10.
"Response Automated Decision Systems", responsecorp.com, Inc., Press Release, Ft. Lauderdale, FL, Jun. 22, 2000, http://web.archive.org/web/20010420061717/http://www.responsecorp.com/news.html.
Roth, Andrew, "CheckFree to Introduce E-Mail Billing Serving," American Banker, New York, Mar. 13, 2001, vol. 166, No. 49, pp. 3.
Screenshot for Investment Account Manager v.2.8.3, published at http://www.aaii.com/objects/get/1642.gif by at least Aug. 30, 2011 in 1 page.
Sear, Alan M., Ph.D., "An Expert System for Determining Medicaid Eligibility", Journal of Medical Systems, Oct. 1988, vol. 12, Issue 5, pp. 275-283.
Search America, Inc. v. TransUnion Intelligence LLC, Declaration of Kenneth Zeger in re: U.S. Pat. No. 7,333,937, Signed Jul. 24, 2013, pp. 9.
Search America, Inc. v. TransUnion Intelligence LLC, Decision, Case No. CBM2013-00038, U.S. Pat. No. 7,333,937, Feb. 7, 2014, pp. 24.
Search America, Inc. v. TransUnion Intelligence LLC, Declaration of Kenneth Zeger in re: U.S. Pat. No. 8,185,408, Signed Jul. 29, 2013, pp. 9.
Search America, Inc. v. TransUnion Intelligence LLC, Patent Owner Transunion Intelligence, LLC's Preliminary Response, Case No. CBM2013-00037, U.S. Pat. No. 7,333,937, Nov. 11, 2013, pp. 28.
Search America, Inc. v. TransUnion Intelligence LLC, Patent Owner Transunion Intelligence, LLC's Preliminary Response, Case No. CBM2013-00038, U.S. Pat. No. 8,185,408, Nov. 11, 2013, pp. 26.
Search America, Inc. v. TransUnion Intelligence LLC, Decision, Case No. CBM2013-00038, U.S. Pat. No. 8,185,408, Feb. 7, 2014, pp. 22.
Search America, Inc. v. TransUnion Intelligence LLC, Petition for Covered Business Method Patent Review Under 35 U.S.C. §§ 321 and Section 18 of the Leahy-Smith America Invents Act, U.S. Pat. No. 8,185,408, Jul. 29, 2013, pp. 84.
Search America, Inc. v. TransUnion Intelligence LLC, Petition for Covered Business Method Patent Review Under 35 U.S.C. §§ 321 and Section 18 of the Leahy-Smith America Invents Act, Case No. U.S. Pat. No. 7,333,937, Jul. 29, 2013, pp. 88.
Search America, Inc. v. TransUnion Intelligence LLC, Scheduling Order, Case No. CBM2013-00037, U.S. Pat. No. 7,333,937, Feb. 7, 2014, pp. 7.
Search America, Inc. v. TransUnion Intelligence LLC, Scheduling Order, Case No. CBM2013-00038, U.S. Pat. No. 8,185,408, Feb. 7, 2014, pp. 6.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Technical Architecture Framework, TIERS, May 8, 2000, pp. 67.

(56) References Cited

OTHER PUBLICATIONS

Texas Comptroller of Public Accounts, Texas Performance Review, "Against the Grain: Volume 2," 1993, as printed Dec. 14, 2012 in 7 pages, from http://www.window.texas.gov/tpr/atg/atg/atgtoc.html.
Texas Comptroller of Public Accounts, Texas Performance Review, "Gaining Ground: Volume 2," 1994, as printed Dec. 14, 2012 in 4 pages, from http://www.window.texas.gov/tpr/tprgg/v2home.html.
Texas Department of Human Services, Revision Notice, Revision 99-1, Effective: Jan. 1, 1999, dated Dec. 11, 1998, pp. 11.
Texas Department of Human Services, Revision Notice, Revision 99-3, Effective: Jul. 1, 1999, dated May 28, 1999, pp. 11.
Texas Department of Human Services, Revision Notice, Revision 99-6, Effective: Oct. 1, 1999, dated Sep. 3, 1999, pp. 20.
Texas Department of Human Services, Revision Notice, Revision 00-3, Effective: Apr. 1, 2000, dated Mar. 3, 2000, pp. 17.
Texas Department of Human Services, OIG, 3000—Case Development, Jan. 1999, pp. 3.
Texas Department of Human Services, System Specifications, Section 3.2, Current System Architecture and Functional Specifications, NOA Assembled, pp. 21, as last modified Jul. 4, 2000.
Texas Department of Human Services, System Specifications, Section 3.3, Current System Architecture and Functional Specifications, GWS Assembled, pp. 752, as last modified Jul. 4, 2000.
Texas Department of Human Services, System Specifications, Section 3.3, Current System Architecture and Functional Specifications, GWS Assembled, pp. 754, as last modified Jul. 4, 2000.
Texas Department of Human Services, System Specifications, Section 3.3.1, TESS System, pp. 47, as last modified Jul. 4, 2000.
Texas Department of Human Services, System Specifications, Section 3.4, Current System Architecture and Functional Specifications, LTCMED Assembled, pp. 372, as last modified Jul. 4, 2000.
Texas Department of Human Services, System Specifications, Section 3.5, Current System Architecture and Functional Specifications, SAVERR FS Assembled, pp. 141, as last modified Jul. 4, 2000.
Texas Department of Human Services, System Specifications, Section 3.6, SAVERR TANF Assembled, pp. 219., as last modified Jul. 4, 2000.
Texas Department of Human Services, System Specifications, Section 3.7, Current System Architecture and Functional Specifications, SAVERR INTER/MED, pp. 838, as last modified Jul. 5, 2000. [Uploaded in 2 parts].
Texas Department of Human Services, System Specifications, Section 3.8, Current System Architecture and Functional Specifications, pp. 172, as last modified Jul. 4, 2000.
Texas Department of Human Services, System Specifications, Section 3.8, Current System Architecture and Functional Specifications, SAVERR INTER, pp. 838, as last modified Jul. 4, 2000.
"The Best of the Best," Mortgage Technology, Nov. 1, 2003, vol. 10, No. 8, pp. 34-53.
"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.
"TIERS Procurement Information," Texas Department of Human Services, as captured May 26, 2000 http://web.archive.org/web/20000526131749/http://www.dhs.state.tx.us/programs/TIERS/procurement.html in 3 pages.
TRAkkER Corporation website, trakkercorp.com, TRAkkER Software Description, May 26, 2000, available at http://web.archive.org/web/20000526234204/http://trakkercorp.com/page4.html.
TransUnion Consumer Credit Report http://www.transunion.com/, as retrieved on Sep. 17, 2008.
*TransUnion Intelligence LLC* v. *Search America, Inc.*, Videotape Deposition of James Sunyar, Nov. 12, 2012, Case No. 0:11-CV-01075-EJS-FLN, pp. 128.
*TransUnion Intelligence LLC* v. *Search America, Inc.*, Oral and Videotape Deposition of Bobby Keith Graves, Oct. 26, 2012, Case No. 0:11-CV-01075-PJS-FLN, pp. 181.
*TransUnion Intelligence LLC* v. *Search America, Inc.*, Oral and Videotape Deposition of Kerby Spruiell, May 13, 2013, Case No. 0:11-CV-01075, pp. 257.
*TransUnion Intelligence LLC* v. *Search America, Inc.*, Videotape Deposition of Jodi Halpine, Oct. 16, 2012, Case No. 0:11-CV-01075-EJS-FLN, pp. 176.
*TransUnion Intelligence LLC* v. *Search America, Inc.*, Jury Trial Demand, Non-Confidential Redacted Version, Case No. 0:11-CV-01075-EJS-FLN, pp. 42.
*TransUnion Intelligence LLC* v. *Search America, Inc.*, Jury Trial Demand, Case No. 0:11-cv-01075-PJS-FLN, pp. 18.
*United States of America* v. *Patricia Lahaie Mahaney*, Government's Response to the Standing Discovery Order, Case:0:03-cr-60022-JIC, Entered into docket Jun. 17, 2003, pp. 16.
US Legal, Description, http://www.uslegalforms.com/us/US-00708-LTR.htm printed Sep. 4, 2007 in 2 pages.
Washington Automated Client Eligibility System (ACES), 1996, pp. 13.
"We Eliminate Bad Debt", as printed from http://www.webcreditbureau.com/start/, dated Aug. 22, 2012, 1 Page.
Wesabe.com http://www.wesabe.com/, as retrieved on Sep. 17, 2008.
Wilson, Andrea, "Escaping the Alcatraz of Collections and Charge-Charge-Offs", http://www.transactionworld.net/articles/2003/october/riskMgmt1.asp, Oct. 2003.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
International Search Report and Written Opinion for Application No. PCT/US2008/064594, dated Oct. 30, 2008.
International Preliminary Report and Written Opinion in PCT/US2008/064594 dated Dec. 10, 2009.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Search Report and Written Opinion for Application No. PCT/US2013/072102, dated Apr. 18, 2014.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
Official Communication in Russian Patent Application No. 2014127320, dated Jul. 5, 2016.
International Search Report and Written Opinion for Application No. PCT/US2014/019142, dated Jun. 20, 2014.
International Preliminary Report on Patentability and Written Opinion for Application No. PCT/US2014/019142, dated Sep. 17, 2015.

(56) References Cited

OTHER PUBLICATIONS

International Search Report and Written Opinion for Application No. PCT/US2017/048265, dated Dec. 5, 2017.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.

\* cited by examiner

|  | OUTCOMES | | |
|---|---|---|---|
| Name | Color | Active | Treatment |
| Min Classic | ‖‖‖‖‖‖‖‖‖‖‖‖‖ | Y | $1000 limit |
| Max Classic | \\\\\\\\\\\\\ | Y | $2000 limit |
| Min Gold | ///////////// | Y | $3000 limit |
| Max Gold |  | Y | $4000 limit |
| Min Platinum | ######### | Y | $5000 limit |
| Max Platinum | XXXXXXXX | Y | $6000 limit |
|  | 801 | 802 | 803 | 804 |

| SEGMENT | OUTCOME | CASES | AVG. CREDIT LIMIT |
|---|---|---|---|
| RISK SCORE BANDS | | 18,050 | $4,654 |
|    UNDER 500 | Min Classic | 0 | - |
|    500 TO 650 | Max Classic | 0 | - |
|    OVER 650 | | 18,050 | $4,654 |
|       REVOLVER SCORE BANDS | | 18,050 | $4,654 |
|          UNDER 600 | Min Gold | 705 | $3,000 |
|          600 TO 750 | Max Gold | 7,565 | $4,000 |
|          751 TO 900 — 705a | | 8,410 | $5,000 |
|             REVOLVER SCORECARD SCORE | | 8,410 | $5,000 |
|                UNDER 780 — 1201 | Min Platinum | 2,195 | $5,000 |
|                780 TO 800 — 1202 | Min Platinum | 1,355 | $5,000 |
|                OTHERS — 1203 | Min Platinum | 4,680 | $5,000 |
|          OVER 900 | Max Platinum | 1,370 | $7,000 |

FIG. 12

PROPOSE BEST OUTCOMES

NAME: MAXIMIZE LIMITS ASSIGNED
MEASURE: SUM CREDIT LIMIT
DIRECTION: MAXIMIZE
  — 1501
CONSTRAINTS:  — 1502                                           1503

| Outcome | Active | Eligible | Max Bad Debt | Max Credit Limit | Max Cases |
|---|---|---|---|---|---|
| Overall | No | ☐ | $10,000,000 | $80,000,000 | |
| Min Classic | No | ☐ | | | |
| Max Classic | Yes | ☑ | | | |
| Min Gold | Yes | ☑ | | | |
| Max Gold | Yes | ☑ | | | |
| Min Platinum | Yes | ☑ | | | |
| Max Platinum | Yes | ☑ | | | |

— 1506   — 1504    — 1505

ASSIGNMENTS:   — 1507

⦿ ALL NODES    ○ ONLY UNASSIGNED NODES

PROPOSE BEST OUTCOMES – ANALYSIS FOR REVOLVER SCORE BANDS
GOAL: MAXIMIZE LIMITS ASSIGNED

| SEGMENT | OUTCOME (1601) | SUM CREDIT LIMIT (1602) | SUM BAD DEBT (1603) |
|---|---|---|---|
| REVOLVER SCORE BANDS | | 60,241,000 | 9,997,400 |
|    UNDER 600 | Min Gold | 2,115,000 | *Previous value: 13,953,000* |
|    600 TO 750 | Min Gold | 22,470,000 | 4,494,000 (1604) |
|    751 TO 900 | | 26,066,000 | 3,909,900 |
|       REVOLVER SCORECARD SCORE | | 26,066,000 | 3,909,900 |
|          UNDER 780 | Min Gold | 6,489,000 | 973,350 |
|          780 TO 800 | Max Gold | 5,420,000 | 813,000 |
|          OTHERS | Min Gold | 14,157,000 | 2,123,550 |
|    OVER 900 | Max Platinum | 9,590,000 | 959,000 |

OUTCOMES (1605)

| Name | Color | Active | Treatment | Sum Credit Limit | Sum Bad Debt |
|---|---|---|---|---|---|
| Min Classic | ‖‖‖‖‖‖‖‖ | Y | $1000 limit | | |
| Max Classic | \\\\\\\\ | Y | $2000 limit | | |
| Min Gold | ////////// | Y | $3000 limit | 45,231,000 | 8,225,400 |
| Max Gold | | Y | $4000 limit | 5,420,000 | 813,000 |
| Min Platinum | ######## | Y | $5000 limit | | |
| Max Platinum | XXXXXXXX | Y | $6000 limit | 9,590,000 (1606) | 959,000 (1607) |

(1608) → [APPLY] [MODIFY] [CANCEL]

FIG. 16

SYSTEMS AND METHODS OF ASSISTED STRATEGY DESIGN

CROSS-REFERENCE TO RELATED APPLICATIONS

This application claims priority to, and is a continuation of, U.S. application Ser. No. 13/287,050 filed Nov. 1, 2011 and entitled "SYSTEMS AND METHODS OF ASSISTED STRATEGY DESIGN," which claims priority to U.S. Provisional Patent Application No. 61/409,220 filed on Nov. 2, 2010 and entitled "ASSISTED DESIGN ENVIRONMENT." The entire contents of each of the above referenced applications are hereby expressly incorporated herein by reference in their entireties.

BACKGROUND

The disclosure herein relates to assisted strategy design, and in particular, systems and methods of automation and assistance in the creation and design of process flows and decision trees.

Many areas of business employ process flows, decision algorithms and related systems in order to conduct business in an automated fashion. For example, a credit card issuing company may employ numerous decision algorithms in order to determine whether to offer a credit card applicant a new line of credit and what credit limit to offer that applicant. Typically, such process and design algorithms are encoded in software written by software programmers. Such code may be difficult to modify by anyone other than the programmer who originally wrote the software.

However, in today's world, rapid modification of such decision and process algorithms may be required by businesses in order to remain competitive and up-to-date. The individuals with the greatest knowledge of how to modify these algorithms may not be the same as those people who designed and programmed the automated software. Accordingly, such hard-coded algorithms remain difficult or even impossible to modify, and can often be insufficient for today's business needs.

SUMMARY

Accordingly, embodiments disclosed herein include systems and methods for assisting and automating the design of process workflows, decision algorithms, and such other business processes as may be useful to companies and such entities. Various embodiments as disclosed herein may include graphical user interfaces and/or other user interfaces that may be easily manipulated without requiring extensive knowledge of computer software or computer programming. Additionally, embodiments disclosed herein enable individuals designing such process flows and decision algorithms to easily test and deploy those processes and algorithms.

BRIEF DESCRIPTION OF THE DRAWINGS

FIG. 12 shows a sample user interface of a decision tree after merging a selected split calculated by the next best split algorithm, as used in an embodiment.

FIG. 15 is a sample user interface for specifying rules and constraints for the calculation of proposed best outcomes, as used in an embodiment.

FIG. 16 is a sample user interface displaying proposed best outcomes as used in an embodiment.

DETAILED DESCRIPTION

Figure 1:
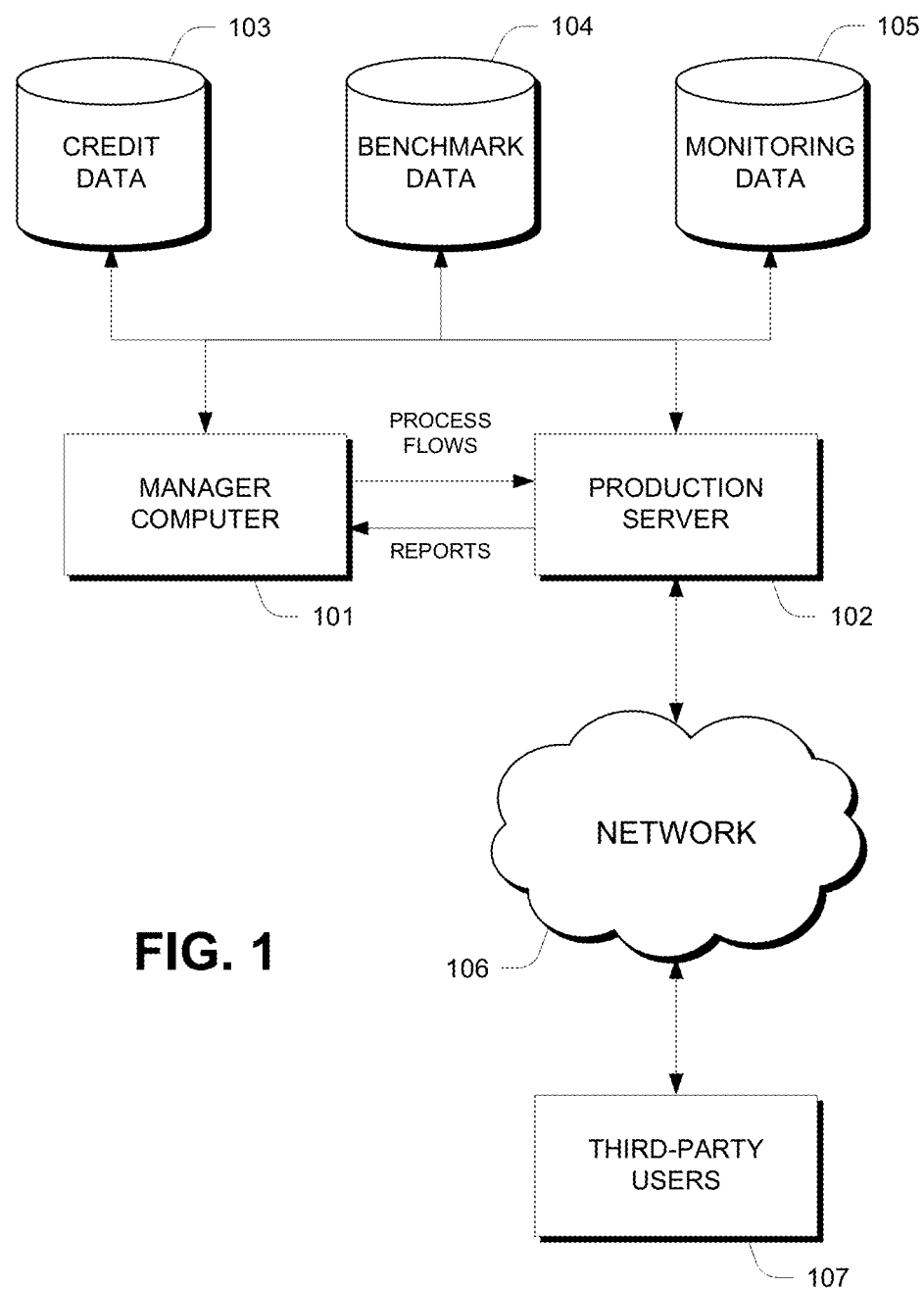
FIG. 1 is a block diagram of a system of assisted strategy design, as used in an embodiment.

FIG. 1 is a block diagram of a system of assisted strategy design, as used in an embodiment. The system includes one or more manager computers 101 which may include specialized software and/or hardware for implementing systems and methods as described through the specification. The manager computer may be operated by a credit risk manager or other individual to design and specify process flows, decision algorithms such as decision trees, and/or other related business processes or algorithms.

The system may also include one or more production servers 102. These servers may be used to perform business-related tasks such as implementing the various processes and algorithms designed on the manager computer 101. In an embodiment, manager computer 101 deploys process flows, algorithms, and other such business processes to the production server 102 via a network communication protocol. The production server 102 may in turn transmit one or more reports to the manager computer 101 on a periodic basis, upon request, or at any other appropriate time. A manager on the manager computer may review the reports received from the production server 102 and use the information contained in the report to update and improve the process flows, algorithms, and so on.

Both the manager computer 101 and the production server 102 may retrieve data from a number of data sources. For example, the manager computer 101 and/or the production server 102 may retrieve credit data from a credit data repository 103. The manager computer and/or the production server may further retrieve benchmark data from data repository 104 which may be, for example, historical data about previous individuals and/or accounts. Additionally, monitoring data may be retrieved and/or stored in repository 105. Additional data sources and/or any subset of these described data sources may be employed by the system.

In an embodiment, the manager computer may have access to different data sources than the production server. This may be useful, for example, in ensuring that the manager computer does not unintentionally modify data used by the production server which could introduce data errors and possible down times in the system.

In various embodiments, some or all of the data sources may be read-only sources. For example, the credit data repository 103 and the benchmark data repository 104 may be read-only, or may be writable only by particular users with appropriate access rights. Additionally, in various embodiments, the data repositories may be maintained on separate storage devices, they may be combined on a single storage device, and/or they may be distributed among multiple storage devices, such as in a cloud data storage system.

Production server 102 may further communicate, via a network 106, with any number of third-party users 107. Such third-party users may wish to take advantage of the various process flows, algorithms, and the like implemented by production server 102. Such third-party users 107 may include users, consumers, business entities, business partners, and further automated services, for example.

As one example, where the production server implements process flows for determining appropriate credit limits for current and/or potential customers of a credit lender, the third-party users 107 may be, for example, credit card applicants, loan approval officers, or other individuals interested in retrieving credit card application information.

The embodiments described herein relate to assisted strategy design software used to develop credit risk management process flows. In particular, the embodiments described herein relate to development software, operated on a computing system, for developing a strategy for analysis of information associated with credit applicants in order to determine to whom credit should be extended, how much credit should be extended, and so on. These embodiments illustrate one example of generating a decision process for offering credit cards to consumers. However, the development software may be used to enable development of other process flows, decision algorithms, and the like, for use in other decision-making tasks. For example, the software may be used to determine appropriate terms and features to the offer for a mobile phone service. The software may also be used to determine parameters for a loan, such as interest rates, loan repayment periods, and down payments, among other things. The software may similarly be used to optimize parameters for automobile loans, consumer loans, and the like. Additionally, the software may be used to develop terms for an insurance contract. The software may further be used in marketing campaigns, for example, to determine appropriate advertisements or offers to present to particular customers. Many other uses for the systems and methods described herein may be contemplated.

Additionally, embodiments of the systems and methods described herein may be operated via software executed on a computing system. The disclosed systems and methods may alternately be embodied in computing hardware, such as read-only memory or specialized microprocessors.

Example System Architecture

Figure 17:
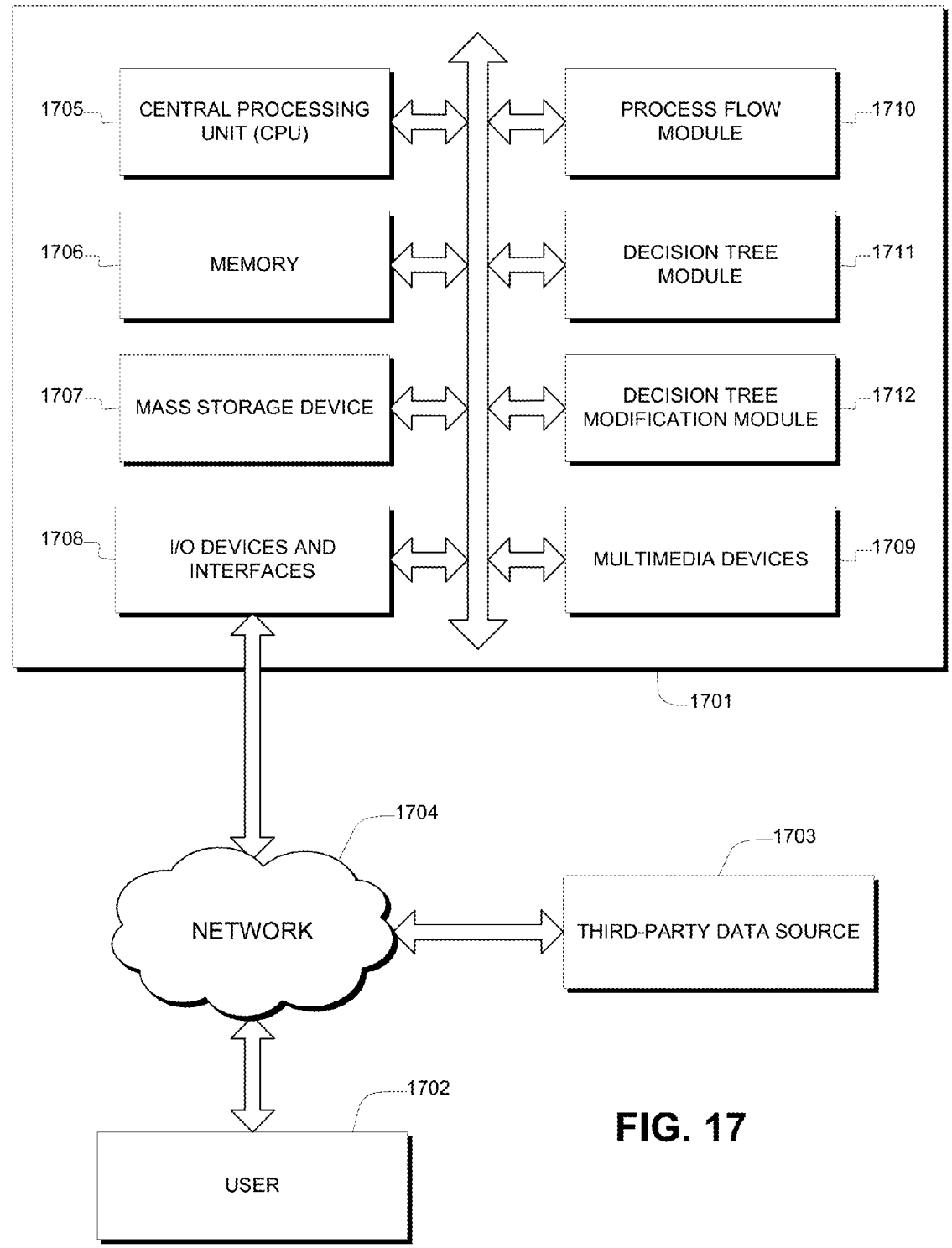
FIG. 17 is a block diagram illustrating one embodiment of a computing system that implements the systems and methods described herein.

FIG. 17 is a block diagram illustrating one embodiment of a computing system that implements the systems and methods described herein. In the embodiment of FIG. 17, a computing device 1701 is in communication with a user 1702, as well as an optional third-party data source 1703, via a network 1704. In an embodiment, the computing device 1701 receives data from one or more data sources 1703. The computing device 1701 may then perform analysis and prepare information for presentation to the user 1702. The manager computer 101, production server 102, and/or any other computing system described herein may include the same or similar components as the computing device 1701. Similarly, the computing devices 1701 may be used to implement any of the methods discussed herein.

The network 1704 may include any communication network or combination of communication networks, such as one or more of the Internet, LANs, WANs, MANs, etc., for example. In the embodiment of FIG. 17, the computing device 1701 includes a computing system having one or more computing devices (e.g., computers). The computing device 1701 may include, for example, a single computing device, a computer server, a smart storage unit, or a combination of one or more computing devices and/or computer servers. Depending on the embodiment, the components illustrated in the computing device 1701 may be distributed amongst multiple devices, such as via a local area or other network connection. In other embodiments the computing device 1701 may include fewer and/or additional components that are illustrated in FIG. 17.

The exemplary computing device 1701 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 1701 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 1701 includes one or more central processing units ("CPU") 1705, which may each include one or more conventional or proprietary microprocessor(s). The computing device 1701 may further include one or more memories 1706, such as random access memory ("RAM"), for temporary storage of information, read only memory ("ROM") for permanent storage of information, and/or a mass storage device 1707, such as a hard drive, diskette, or optical media storage device. The memory 1706 may store software code, or instructions, for execution by the processor 1705 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 1701. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The exemplary computing device 1701 may include one or more input/output (I/O) devices and interfaces 1708, such as a keyboard, trackball, mouse, drawing tablet, joystick, game controller, touchscreen (e.g., capacitive or resistive touchscreen), touchpad, accelerometer, and/or printer, for example. The computing device 1701 may also include one or more multimedia devices 1709, such as a display device (also referred to herein as a display screen), which may also be one of the I/O devices 1708 in the case of a touchscreen, for example. Display devices may include LCD, OLED, or other thin screen display surfaces, a monitor, television, projector, or any other device that visually depicts user interfaces and data to viewers. The computing device 1701 may also include one or more multimedia devices, such as speakers, video cards, graphics accelerators, and microphones, for example.

In the embodiment of FIG. 17, the I/O devices and interfaces 1708 provides a communication interface to various external devices via the network 1704. For example, the computing device 1701 may be electronically coupled to the network 1704 via a wired, wireless, or combination of wired and wireless, communication link(s). The network 1704 may allow communication with various other computing devices and/or other electronic devices via wired or wireless communication links.

In the embodiment of FIG. 17, the computing device 1701 may include various modules described in further detail below. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 1701, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 17, the computing device 1701 includes three modules, namely, a process flow module 1710 that provides a user interface for building process flows, a decision tree module 1711 that provides a user interface for managing decision trees, and an decision tree modification module 1712 that provides algorithms for automatically assisting in modifying decision trees, such as proposing best outcomes and splitting/growing decision trees. In other embodiments, the modules may be distributed across multiple devices, and may be controlled and/or operated by multiple different entities. These modules are configured to perform methods as described throughout this specification. In various embodiments, fewer or additional modules may be included within a computing system.

In an embodiment, process flow module 1710 provides one or more user interfaces for building and modifying process flows. The module may, among other things, display user interfaces such as those shown in FIGS. 2-3. Additionally, it may provide interfaces enabling a user to modify aspects of a process flow, such as the order of steps. It may also present reports, such as that shown in FIG. 5.

In an embodiment, decision tree module 1711 provides one or more user interfaces for managing decision trees. The module may, among other things, display user interfaces such as those shown in FIGS. 7-9. It may be invoked by selecting a step from a process flow during the invocation of module 1710, and it may further invoke decision tree modification module 1712.

Figure 10:
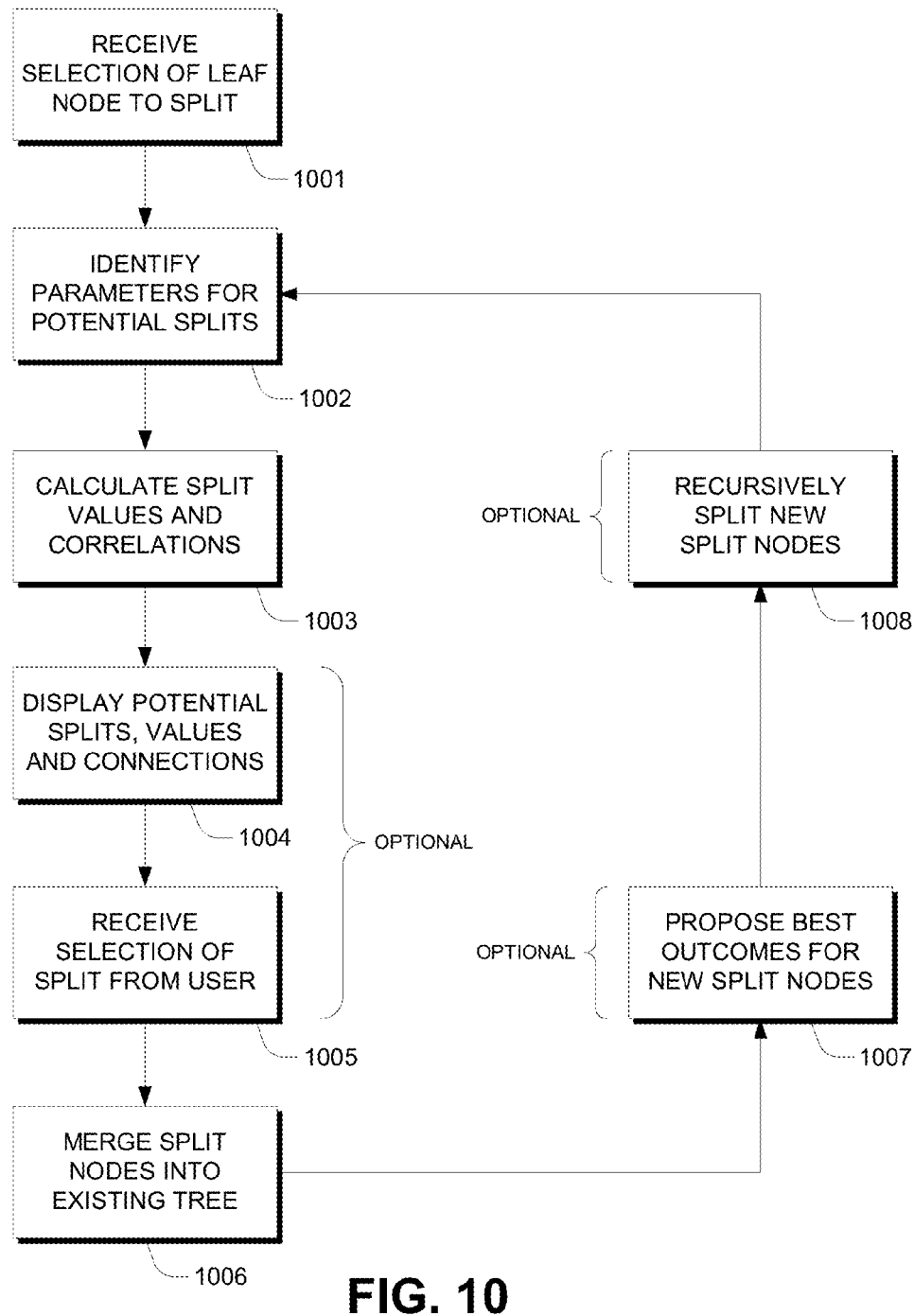
FIG. 10 is a flowchart of an algorithm for performing the next best split analysis as used in an embodiment.
Figure 14:
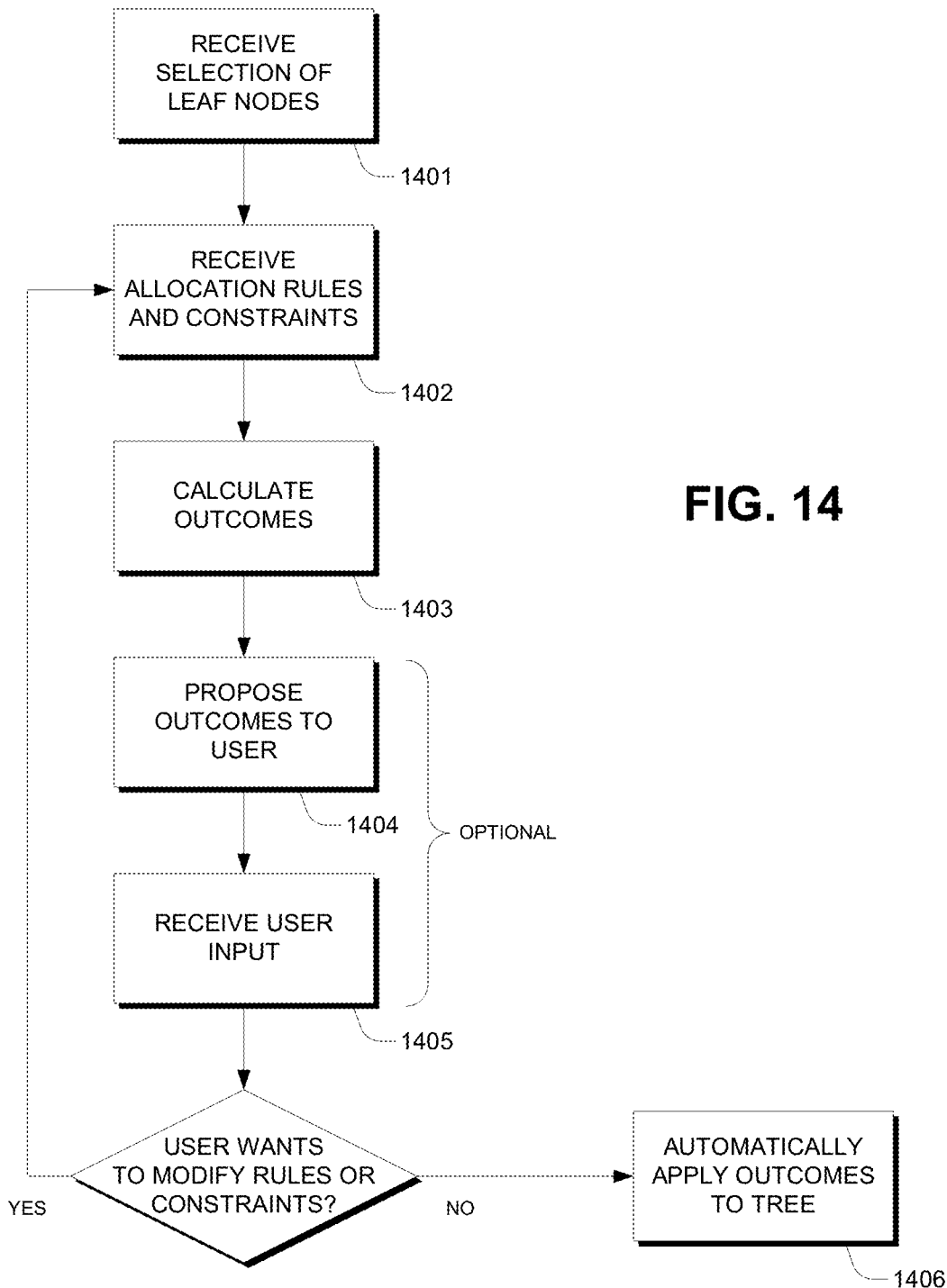
FIG. 14 is a flow chart of a process of automatically proposing outcomes for decision trees, as used in an embodiment.

In an embodiment, decision tree modification module 1712 provides one or more algorithms for automatically assisting in modifying decision trees. The module, may, among other things, perform "next best split" and "grow" computations as shown in FIG. 10, and perform computations to propose best outcomes for a decision tree or part of it as shown in FIG. 14.

Any of the above modules, and other modules, may embody the various systems and methods disclosed, as well as additional systems and methods. The modules described here are particularly pertinent to manager computer 101 of FIG. 1, and other modules may be included on the production server 102, such as a process flow execution module configured to perform methods such as that shown in FIG. 4, a decision tree module configured to execute decision trees such as that shown in FIG. 6, and a monitoring module configured to store monitoring data.

The computing device 1701 may be configured to acquire user data and other external data such as third-party data. The various modules and/or other modules may comprise software alone, hardware alone, or a combination of software and hardware. The device may be especially adapted to communicate using a variety of network or communications protocols in order to communicate with external data sources such as data repositories, network servers, online services, telecommunication services, distributed computing systems, and so on. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 1701 may be configured to transmit, or initiate transmission of, data such as user interfaces, data reports, application programming interface data, or the like, to requesting entities, such as external user 1702, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules described above and/or other modules are configured to act in real-time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

Figure 2:
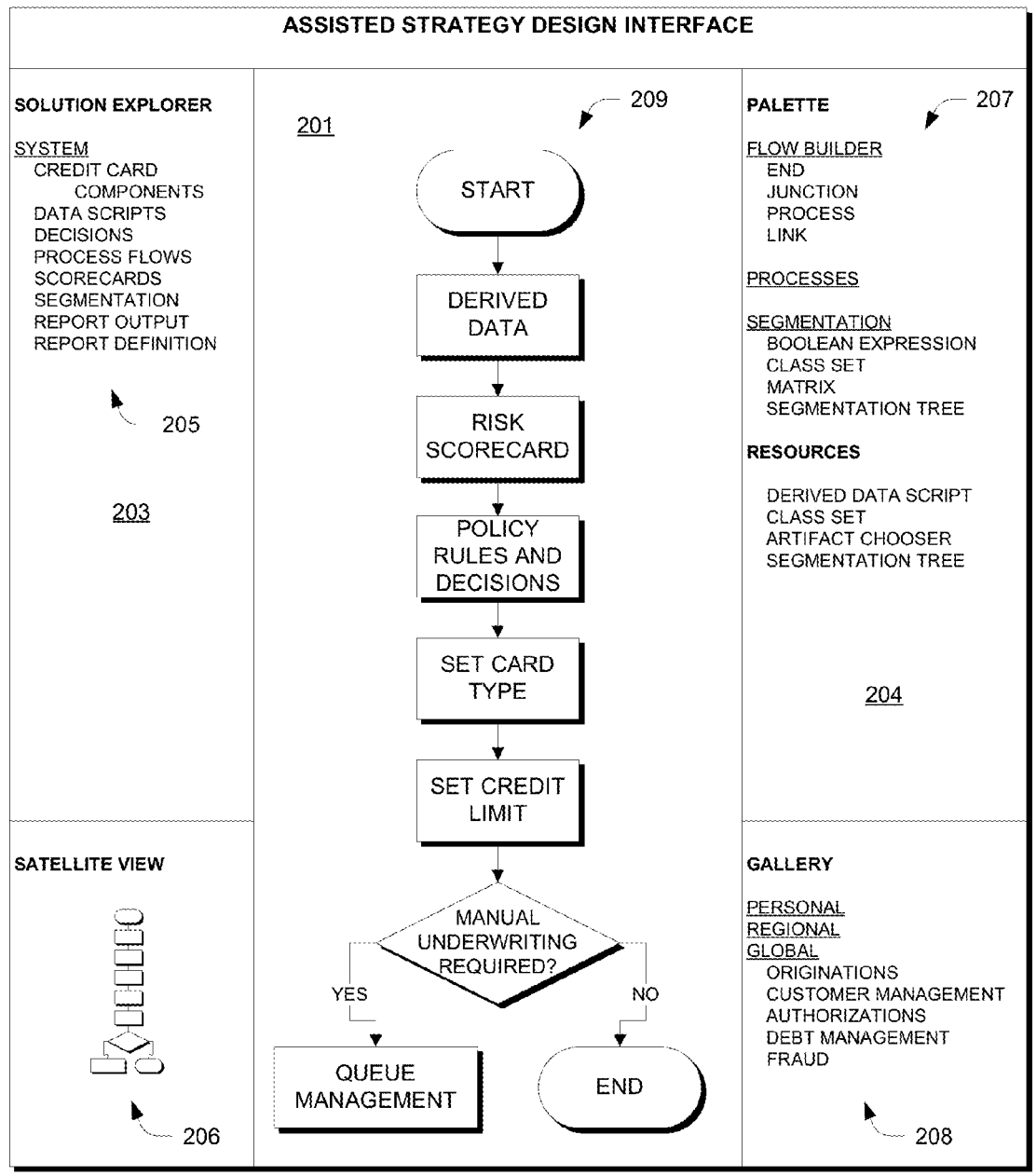
FIG. 2 is a sample user interface presented by an embodiment of assisted strategy design software.

FIG. 2 is a sample user interface presented by an embodiment of assisted strategy design software. The embodiment shown includes a design pane 201 which the user may use to design process flows and algorithms. The interface may further include one or more tool bars or tool panes 203 and 204 to provide options for the user in designing the process flows or algorithms.

Several of the tools are depicted in FIG. 2. For example, Solution Explorer 205 provides options for steps or components of the process flow as it is being built. Satellite View 206 enables the user to easily view the contents of the main pane 201. Palette 207 provides further for constructing process flows and decision algorithms. Gallery 208 enables a user to select personal, regional and/or global templates. In this example, a card origination template is selected from the global gallery to quickly create a basic process flow. Templates can range from very simple templates that include sections of business logic, for example, to complete strategies and associated configuration.

In an embodiment, the user may create and/or modify a process flow being designed by manipulating the user interface, and in particular, design pane 201. For example, FIG. 2 illustrates a process flow 209 that was generated from a template design. In this particular embodiment, process flow 209 illustrates a template card origination process that includes multiple processes, or steps, arranged in the design pane 201. Any or all of the steps may be customizable by the user, for example, by drag-and-drop operations and/or other input to the user interface.

Design pane 201 may further be used to design decision algorithms as described subsequently in the specification. In an embodiment, the particular tools shown in tool bars 203 and/or 204 may automatically be modified to provide appropriate tools for the particular task being performed in design pane 201.

In an embodiment, the development software advantageously allows for storage of outcome data at various stages in the flow of the process. For example, a user may wish to store output data that is generated by the "policy, rules, and decisions" step of process flow 209. Storing outcome data at various steps of the process flow allows for the stored data to be later accessed and analyzed for improving the decisioning process at each of the various steps so that the user is not required to modify the process based only on an end result.

Figure 3:
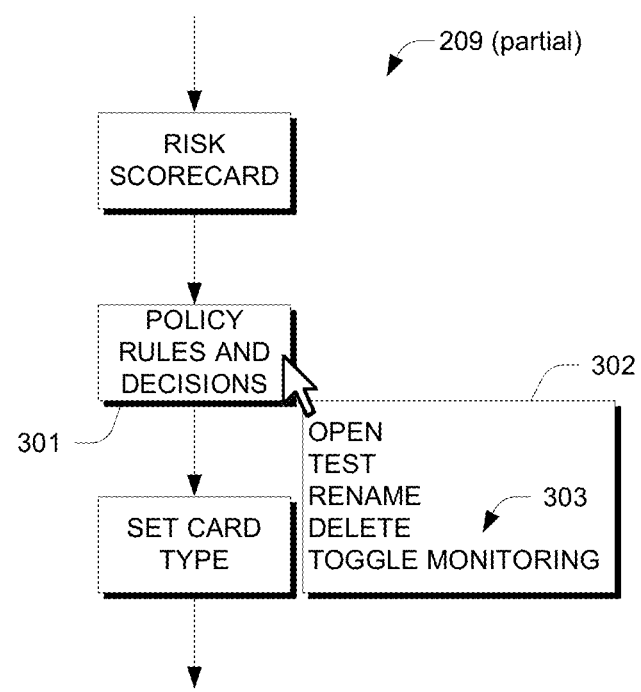
FIG. 3 is a portion of a user interface presented by an embodiment of assisted strategy design software.

In an embodiment, the ability to toggle storage of outcome data associated with any process of a process flow may be accomplished with a user interface interaction such as a command in a pop-up menu associated with a particular process, such as is depicted in the example of FIG. 3. When a user interacts with "policy, rules, and decisions" step 301 of process flow 209, a menu may be displayed. The interaction may be, for example, right-clicking on the particular step. In other embodiments, other interactions may be used, and forms of input other than a pop-up menu may be employed.

In the example of FIG. 3, process step 301 has been right-clicked so that menu 302 has been displayed. One of the options of menu 302 is "toggle monitoring" 303 which can be selected to enable or disable storage of outcome data at the particular process step 301. Thus, storage of outcome data at multiple steps of the process flow may be easily initiated and stopped. In one embodiment, the monitoring data is saved in an unstructured form which reduces the impact on the data storage structures and host applications. Furthermore, the monitoring data that is stored by the monitoring process is accessible to the development software such as in updating process flow parameters after testing a process flow for a period of time.

In an embodiment, the storage of data for monitoring is performed by a computing system different from the computing system operating the design software. For example, with respect to FIG. 1, the design software may operate on manager computer 101, while the storage of data for monitoring is done by production server 102. Thus, when the "toggle monitoring" option 303 is selected, the manager computer 101 may send an instruction to production server 102 to enable or disable monitoring. The instruction may then be sent to the production server 102 upon occurrence of an event, such as the user saving the process flow being designed, or the user requesting that the process flow be deployed for production. Alternatively, the instruction may be sent in real time so that monitoring may be started or stopped without significant delay.

In an embodiment, the particular data that is stored may be formatted in accordance with the particular nature of the step associated with the monitoring. For example, should the user enable monitoring for the policy, rules, and decisions step 301, the system may store the following data records:

| Decision/Policy Rules Monitoring Data | |
|---|---|
| Monitoring ID | Unique ID of the Decision Setter component |
| Number of fired categories | The number of rows in the following table:- |
|    Category ID | Index to the Decision Category |
|    Number of rules fired | The number of rows in the following table:- |
|       Fired rule ID | Index to the fired rule |

Should the user enable monitoring on the "risk score card" step, the system may store the following data records:

| Scorecard Monitoring Data | |
|---|---|
| Monitoring ID | Unique ID of the Scorecard component |
| Intermediate Score | Score value, prior to any final transformation |
| Final Score | Final score value, after any final transformation |
| Score index | Graded score value |
| Number of scoring elements | The number of rows in the following table:- |
|    Element id | Sequence number of the element |
|    Outcome ID | Outcome ID (within element) |

-continued

| Scorecard Monitoring Data | |
|---|---|
| Characteristic value | (for univariate scoring) Data value for the scored element |
| Characteristic x-value | (for bi-variate scoring) Data value for the x-axis element |
| Characteristic y-value | (for bi-variate scoring) Data value for the y-axis element |

Other appropriate data may be stored for any of the other steps that may be included in a process flow. In an embodiment, the particular data required to be stored for a step may change as the user modifies parameters associated with that particular step. For example, the user may add additional entries into a risk scorecard which may necessitate the storage of further data records if monitoring is enabled for the risk scorecard step. Accordingly, in an embodiment, the system stores data records in a format such that future records may be added without requiring modification to existing stored data. In doing so, the system advantageously does not require rebuilding of previous data that has been stored, despite the format change. Thus, although in previous systems it may have been a complex and costly process to enable monitoring, and valuable data may simply have been discarded, the present system provides the flexibility to simply turn on monitoring in order to secure monitoring data without requiring manual modification of the data store. In an alternate embodiment, the system modifies the data formats and records, and it converts previously stored data to conform to the new formats and records that are required.

Figure 4:
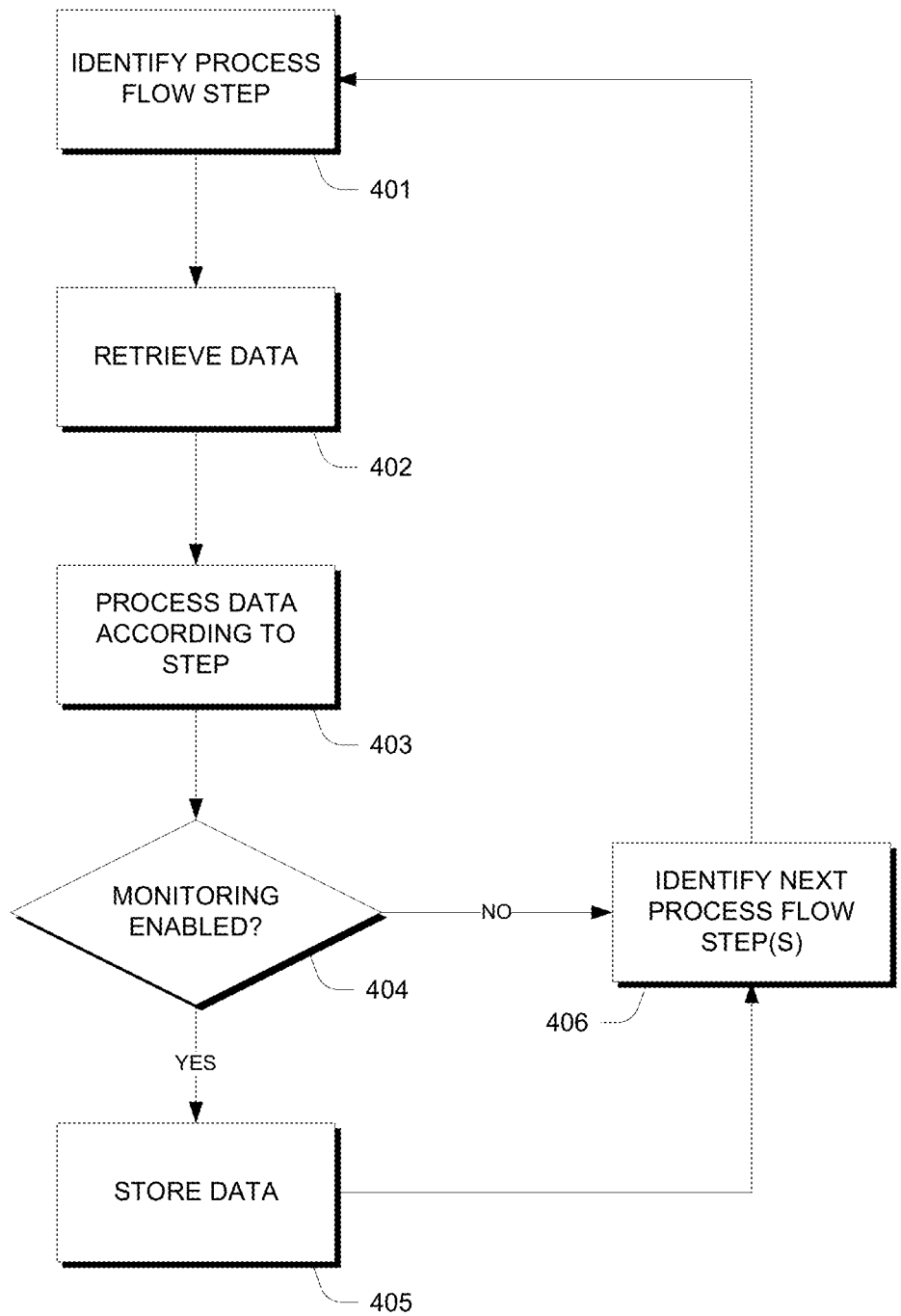
FIG. 4 is a flowchart of a process of executing a user specified process flow, as used in an embodiment.

FIG. 4 is a flowchart of a process of executing a user specified process flow, as used in an embodiment. The flowchart of FIG. 4 may be implemented, for example, on production server 102 of FIG. 1 in order to execute a user-specified process. Additionally, or alternatively, manager computer 101 of FIG. 1 may execute the process shown in FIG. 4 in order to test a newly designed process flow, for example. In various embodiments, additional blocks may be included, some blocks may be removed, and/or blocks may be connected or arranged differently from what is shown.

At block 401, a process flow step is identified. For example, upon initiating execution of a process flow, the first step in the process flow is identified. Alternatively, any step of a process flow may be otherwise manually or automatically selected.

At block 402, data is retrieved in accordance with the process flow step identified. The data may be retrieved from internal and/or external data sources such as the credit data repository 103, the benchmark data repository 104, and/or the monitoring data repository 105 shown in FIG. 1. The particular data to be retrieved may be identified based on data associated with the process flow step.

At block 403, the retrieved data is processed according to instructions associated with the process flow step, identified at block 401. Such data analysis may include executing decision algorithms specified by the creator of the process flow. Other data processing may include data aggregation, summarization, selection, calculation, and the like. The result of processing the data at block 403 may include output data resulting from the processing, and/or modifications to the retrieved data.

At block 404, the process flow step is reviewed to determine if monitoring has been enabled on the particular step. If monitoring has been enabled on that step, then, at block 405, data is stored, in accordance with the process flow step and any output generated at block 403. In an embodiment, data is temporarily stored in a first storage location at block 405, and then all of the temporarily stored data is moved to a second storage location after completion of all steps, so that bulk data transfer efficiencies may be realized. Otherwise, execution proceeds to block 406 where the next process flow step or steps are identified, based on data associated with the current process flow step. Once those next process flow steps are identified, then the operations of FIG. 4 may be repeated on those steps until the process flow has been fully executed.

As an example of the operations of FIG. 4 in an embodiment, consider the "Set Credit Limit" step of the process flow shown in FIG. 2. At block 401, the "Set Credit Limit" step would be identified. At block 402, any data for the "Set Credit Limit" step would be retrieved. This data may include, for example, credit data about a particular individual, and it may include data computed during the performance of a previous step of the process flow.

At block 403, this data is processed, for example with a decision tree associated with the "Set Credit Limit" step. The decision tree may be internally stored, for example, in a form shown in FIG. 6. Based on the decision tree or other processing, one or more outputs are calculated. The outputs may be, for example, credit limits determined to be appropriate for the individual based on the credit data and other data from block 402.

At block 404, it is determined whether monitoring is enabled on the "Set Credit Limit" step. If it is, then at block 405, the calculated outputs are stored, along with possibly other information such as the information retrieved at block 402. At block 406, any next steps associated with the "Set Credit Limit" step are identified. In the example of FIG. 2, the next step would be the "Manual Underwriting Required" determination. That next step would then be identified to be performed.

In an embodiment, the development software further includes monitoring functionality that includes a suite of reports for various business problems. The monitoring functionality may be configured to suit each client's solution, run automatically against the data at regular intervals, identify issues in any part of a strategy represented by a process flow, and/or provide reports that are defined and reviewed in the same software user interface as shown in, for example, FIG. 2.

Figure 5:
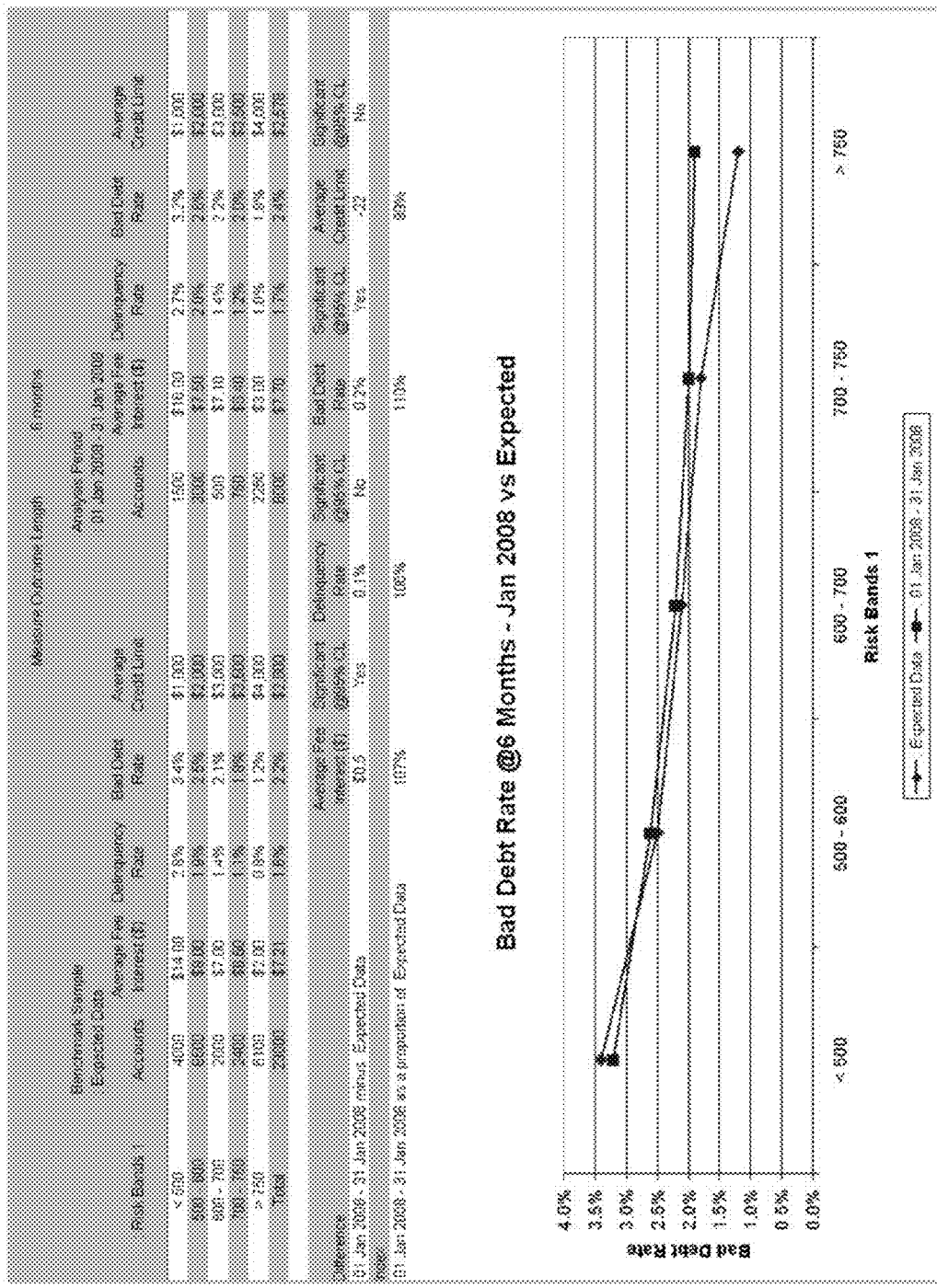
FIG. 5 is an embodiment of a Bad Debt Rate report which includes both a tabular and a graphical view of the performance of a strategy represented by a process flow.

Some examples of reports that may be generated include: an acceptance rate report, a referral analysis report, a score discrimination report, a terms of business comparison report, an advanced management report, and so on. An example of one such report is shown in FIG. 5. The report shown in FIG. 5 is a sample Bad Debt Rate report which includes both a tabular and a graphical view of the performance of a strategy represented by a process flow. This sample report displays higher bad debt rates than expected in the top score band, indicating that perhaps limits that are too high are extended to parts of this population. In one embodiment, the charts can be drilled into from the software user interface, as the data used to generate this report is available for analysis and further improvement of the process flow. Reports such as that shown in FIG. 5 may aid a user in determining that there is a problem and/or a possible enhancement to a process flow. For example, reports may be generated based on stored monitoring data, as discussed above, and using preconfigured report styles such as templates, in order to provide insight into the effectiveness of a strategy represented by a process flow.

In an embodiment, the software enables users to create decision algorithms such as decision trees. Such decision trees may be used as part or all of a step of a process flow. For example, the step of setting a credit limit shown in process flow 209 of FIG. 2 may involve a decision tree for determining appropriate credit limits for an individual being processed according to the process flow.

In other embodiments, decision algorithms may be embodied in forms other than a decision tree, such as a Boolean expression, a class set, a matrix, a segmentation tree, a test group set, a treatment table, and/or any other form of decision algorithm, as well as any combination of the above.

Figure 6:
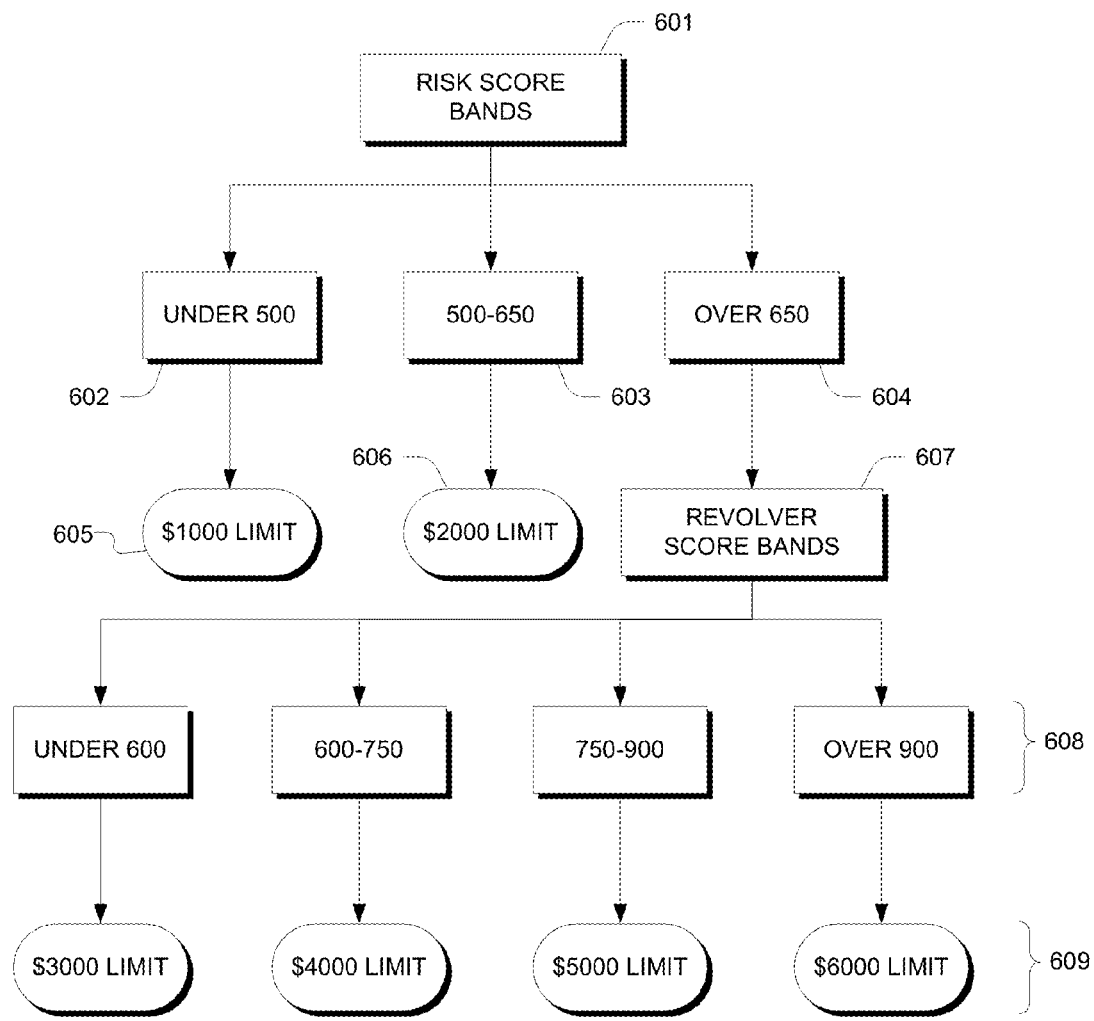
FIG. 6 depicts an example decision tree for setting a credit limit as used in an embodiment.

FIG. 6 depicts an example decision tree for setting a credit limit as used in an embodiment. The decision tree may be represented internally in a computer-readable format so that it may be executed by a computer such as production server 102 or manager computer 101 of FIG. 1.

The tree shown in FIG. 6 includes a number of nodes. At the top of the tree is node 601 labeled "risk score bands." When this decision tree is executed for a particular individual, the risk score for that individual may be identified at this node. Node 601 has three sub-nodes 602, 603, and 604 representing various categories of risk scores. The individual's particular risk score would be compared to these three nodes so that an appropriate action may be taken. For example, if the individual's risk score is under 500 then node 602 would be applied. Accordingly, output 605 would be applied to the individual so that a $1,000 credit limit would be given. Similarly, if the user's risk score is between 500 and 650, then node 603 would be applied and the user would receive a $2,000 credit limit as shown in output 606.

Nodes 602 and 603 may be called "leaf nodes" because, when they are reached, no further decision need be made and an output may be immediately determined. In contrast, node 604 is not a leaf node because further decision is required at that point. If the individual's risk score is over 650, then execution must proceed to node 607 where the individual's revolver score may be retrieved. Based on the revolver score, various credit limits may be granted to the user as shown in nodes 608 and outputs 609.

The risk score and revolver score described here are metrics calculated about individuals based on personal information. For example, the risk score may be a credit score or other metric of credit risk, and the revolver score may be a measure of the individual's use of revolving credit. Other metrics and scores may be included in a decision tree. Additionally, non-numeric data may be included in a decision tree. For example, an individual's marital status may be included in the tree.

In an embodiment, each node on a decision tree may include several parameters. A node may be associated with a data parameter, such as the risk score or revolver score. A node may further be associated with a condition, such as a set or range of values, or other logical test. The condition and/or the associated data parameter may be used to determine whether a particular individual falls within the scope of a node. Additionally, a node may be associated with one or more outcomes. Nodes may also be associated with one or more subnodes or children nodes, indicating further conditions to be tested with respect to an individual who falls within the scope of the node.

In an embodiment, the design software enables manipulation of a decision tree such as that shown in FIG. 6, and performs various processes (discussed herein) in order to assist the user in developing, extending, and/or otherwise optimizing the decision tree. Such manipulation may be done by interaction with a graphical user interface or other interface. In alternate embodiments, such manipulation may be done by keyboard, text commands, and/or computer-readable files or instructions.

Figure 7:
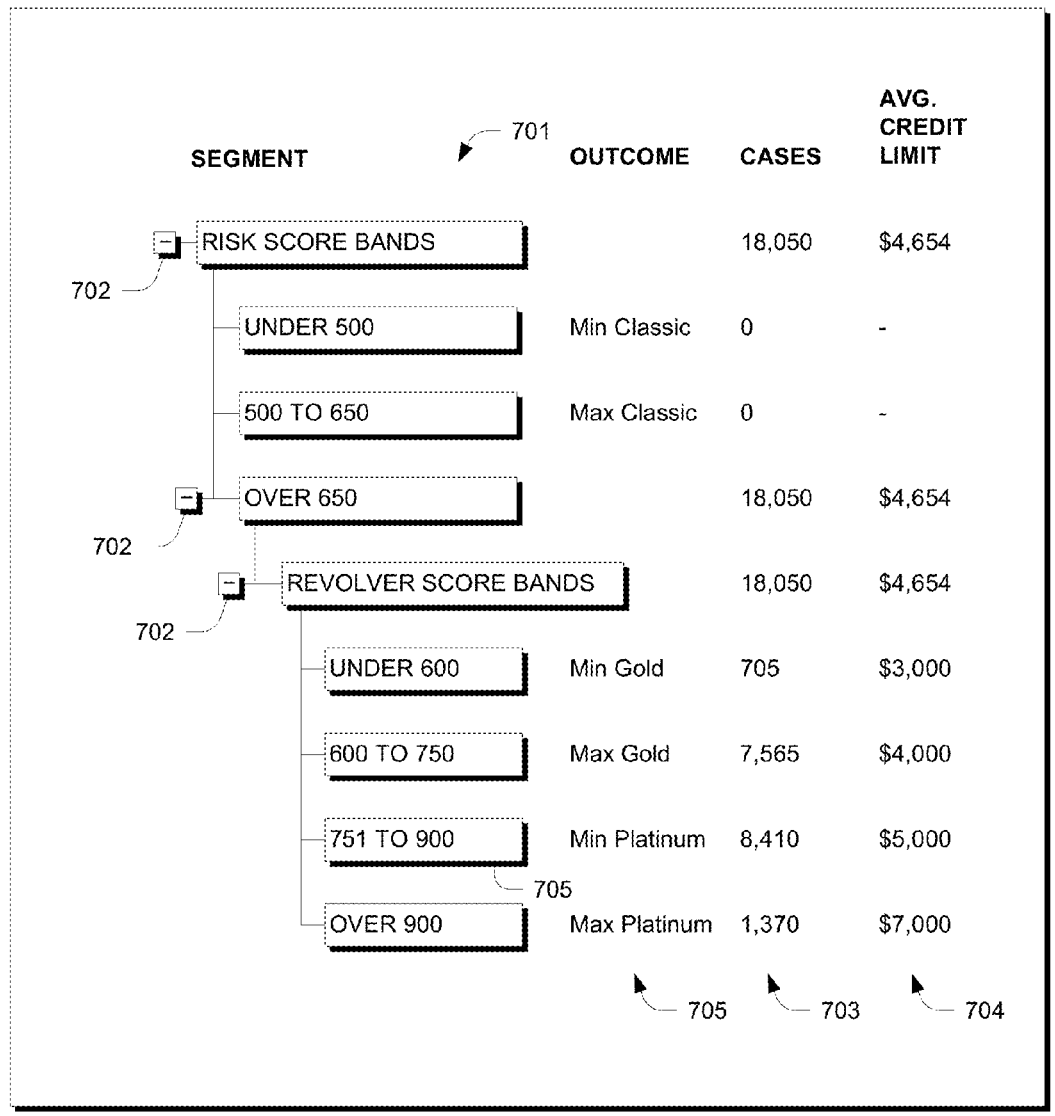
FIG. 7 shows a sample user interface for modifying a decision tree as used in an embodiment.

FIG. 7 shows a sample user interface for modifying a decision tree, as used in an embodiment. The interface may be displayed, for example, on a manager computer 101 of FIG. 1. The interface of FIG. 7 may be included, for example, in design pane 201 of FIG. 2. The embodiment shown in FIG. 7 relates to modifying a decision tree associated with the "set credit limit" step of process flow 209 of FIG. 2. Other steps of process flow 209 may be similarly customized using this and/or other interfaces.

Each of the nodes of the decision tree being created is depicted in a tree of nodes 701. The nodes may be expanded or collapsed using buttons 702, thereby enabling ease of viewing and modification of the decision tree.

In an embodiment, the nodes of the decision tree are applied to a benchmark data set in order to provide sample statistics and/or other information. For example, column 703 displays the number of cases in the benchmark data set that correspond with each of the nodes 701. Column 704 displays the average credit limit for individuals associated with particular nodes 701. Additional information may be included in various columns and shown on the user interface.

In an embodiment, the outcomes associated with each node of the decision tree may be shown in column 705. Although in FIG. 6 the outcomes shown were simple credit limits, the outcomes shown in column 705 are named entities which may be associated with numerous parameters, as described subsequently with respect to FIG. 8.

The benchmark data set information shown in column 702 and 703 may be useful to the user in refining the decision tree. In the sample data shown in FIG. 7, the node labeled "751-900" 705 has more cases than any of the other leaf nodes. Thus, one way to possibly improve on the segmentation among the leaf nodes would be to further subdivide the "751-900" score band node. The development software advantageously makes the further segmentation easy to implement by analyzing monitoring data, benchmark data, and/or other data, and providing suggested segmentation changes.

Figures 8, 9:
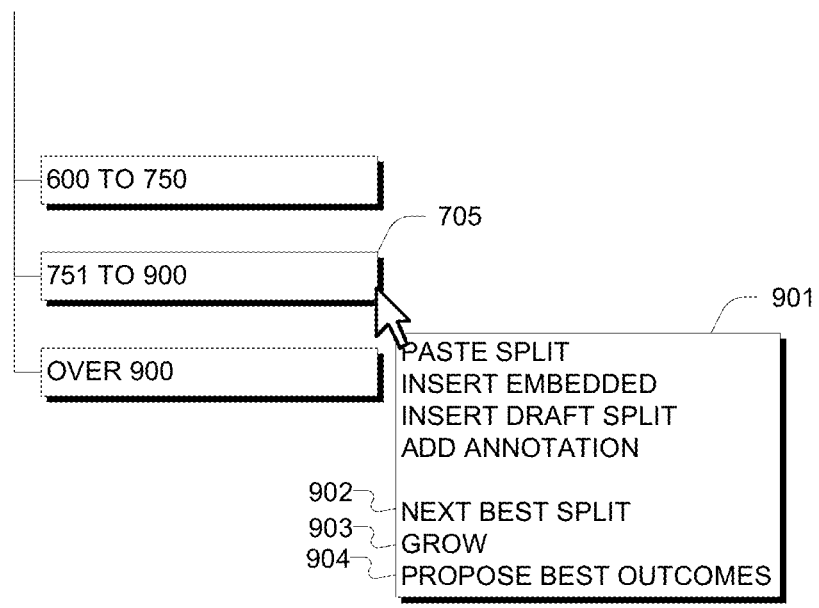
FIG. 8 shows a sample user interface for managing outcomes as used in an embodiment.
FIG. 9 depicts a user interface for selecting among various options for assisting in modifying a decision tree, as used in an embodiment.

FIG. 8 shows a sample user interface for managing outcomes as used in an embodiment. The outcomes may be associated with leaf nodes as shown in column 704 of FIG. 7.

The interface includes a table with columns for names of outcomes 801, colors of outcomes 802, whether or not the outcome is active 803, and a treatment for the outcome 804. The treatment may include a specification of how an individual should be treated given a particular outcome. For example, as shown in FIG. 8, if the outcome determined for a particular individual is "Max Gold" then the individual will be offered a $4,000 credit limit.

The interface may enable a user to add, modify, and/or remove particular outcomes. Additionally, the treatment may include other related and relevant information such as credit card, contract terms, interest rates, penalty rates, and the like. The interface may provide options for creating, modifying, and otherwise managing various treatments for outcomes.

In an embodiment, decision trees such as that shown in FIG. 7 may be modified either automatically or manually. The software may provide various tools for automatically modifying a decision tree and/or assisting the user in determining how to modify a decision tree.

FIG. 9 depicts a user interface for selecting among various options for assisting in modifying a decision tree, as used in an embodiment. When a user selects a particular node 705 of the tree, for example by clicking on it, a menu 901 may be displayed. The menu may include several options including "next best split" 902, "grow" 903, and "propose best outcomes" 904, as well as other options and/or any subset of these options. Each of these three options will be described in turn.

The "next best split" option 902 enables the user to initiate analysis of outcome data by the development software, in order to develop a proposed further segmentation of the selected node, in an embodiment. The user may be provided with the option to indicate a quantity of additional subnodes into which the selected node should be segmented, or the user may simply use a default number of subnodes. Additionally, the user may be able to select one or more data parameters to be analyzed or optimized. Once these and/or other options are selected, the development software performs an analysis and returns a proposed further segmentation.

In one embodiment, the analysis is performed using data that was used in creating a report, monitoring data, and/or benchmark data. Other data may be used, and/or a combination of data may be used, in various embodiments. In some situations, simulated or modeled data may be used in the analysis.

FIG. 10 is a flowchart of an algorithm for performing the next best split analysis, as used in an embodiment. The algorithm may be performed, for example, on manager computer 101 of FIG. 1 in the process of designing a decision tree. In various embodiments, additional blocks may be included, some blocks may be removed, and/or blocks may be connected or arranged differently from what is shown.

At block 1001, a selection of a leaf node or other node for splitting is received. The selection may be made, for example, by the user clicking on the particular node to be split. In an embodiment, if the user selects a node that is not a leaf node, then the system may, in some embodiments, remove any children of the selected node prior to performing the next best split analysis.

At block 1002, the parameters for potential splits are identified. These parameters may include, for example, a number of subnodes to create, one or more parameters to be analyzed and/or optimized, one or more factors on which the splitting should be performed, a set of parameters on which splitting is to be permitted, and so on.

Then, a set of splits, with associated subnodes, is calculated at block 1003. A "split," as used here, refers to an identified parameter associated with individuals that is to be used to categorize those individuals within the decision tree. The splits and subnodes may be calculated using statistical algorithms, artificial intelligence algorithms, heuristic calculations, optimization algorithms, and the like. The calculation should result in one or more sets of new leaf nodes to be proposed for addition as children to the selected node. Additionally, appropriate values for the conditions of each of the leaf nodes may be calculated. For example, the calculation may determine that a split based on the marital status parameter is appropriate. Thus, it may propose adding three new subnodes, one representing a status of "single," one representing a status of "married," and one representing a status of "divorced." In some cases, the calculation may determine that it is preferable to bundle one or more of the categories together, for example creating a new subnode representing the statuses of "single/divorced."

In addition to calculating the conditions for the new subnodes created by the next best split algorithm, a set of correlations may also be calculated. The correlations may indicate, for example, how optimal a particular split is or how strongly the particular split correlates with a desired factor. Such correlations may be used by the user to assess which of the splits is best. Alternately, in an embodiment, the user is not asked to review the proposed splits, and the system automatically selects the best split based on a correlation value calculated at block 1003.

In the case where the user is queried for inputs, the system displays the potential splits, and associated values and correlations, at block 1004. Such a display may be made in a user interface such as that shown in FIG. 11.

At block 1005, the user may select one of the potential splits automatically generated by the software. Alternately, the user may wish to modify parameters to the next best split algorithm, in which case the process may return to block 1001 or 1002.

At block 1006, the new leaf nodes calculated by the next best split algorithm and optionally selected by the user at block 1005 may be merged into the existing decision tree. Thus, the decision tree may be expanded upon completion of the next best split algorithm.

At block 1007, the software may optionally automatically propose outcomes for the new leaf nodes calculated by the next best split algorithm. A procedure for proposing best outcomes for these new nodes is shown, for example, with reference to FIG. 14. The user may then accept and/or modify the automatically proposed outcomes for each of the new nodes. Alternately, the system may not calculate outcomes for the new nodes generated by the next best split algorithm, but instead may simply assign each of those new nodes a default outcome or no outcome.

At block 1008, the software optionally continues to split the newly created subnodes. This is used for example, in the "grow" option 903 of FIG. 9. If such an option is enabled, then the system may perform calculations such as determining whether further splitting of subnodes is advantageous and/or determining which subnodes to split, based on various metrics and calculations. If the optional block 1008 is performed, then execution again proceeds to block 1002 to further perform the next best split algorithm on the subnode (s) selected at block 1008.

The assisted design techniques of the development software as so described herein allow a predictive strength analysis of multiple attributes. For example, a particular segment or node may be selected for splitting and/or growing of the decision tree, for example by selecting the "next best split" option 902 or the "grow" option 903 of FIG. 9, in order to cause the development software to determine a number of characteristics that could be used in segmentation which are better predictors of characteristics, such as bad debts. Thus, the automated features of the embodiments described herein are advantageously more effective than manual analysis and creation of decision trees.

Once the decision tree has been augmented based on any of the various mechanisms described herein, the decision tree and/or process flow may be updated and sent to be used in a production environment automatically. For example, manager computer 101 shown in FIG. 1 may apply the next best split algorithm or a grow procedure to an existing decision tree and then send the updated decision tree and/or process flow to production server 102, simply by clicking an appropriate button or otherwise interacting with a user interface on manager computer 101. The new process flow and/or decision tree may then replace on existing process flow being used in production or it may be used as a challenger strategy to run against a chosen random population of future decisions.

Figure 11:
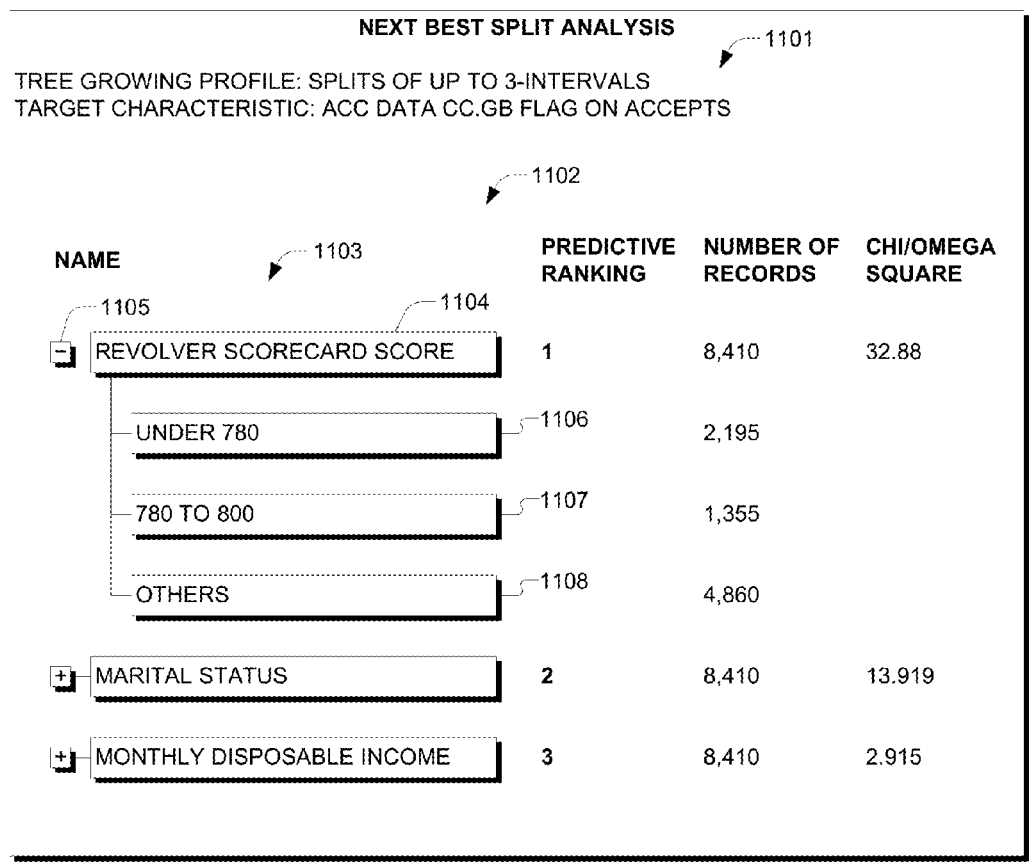
FIG. 11 shows a sample user interface displayed during a next best split analysis as used in an embodiment.

FIG. 11 shows a sample user interface displayed during a next best split analysis, as used in an embodiment. The user interface of FIG. 11 may be shown in a portion of design pane 201 of FIG. 2, for example. The interface of FIG. 11 may be shown during the performance of block 1004 of FIG. 10, for example.

The interface of FIG. 11 may display various parameters 1101 that were applied to the next best split algorithm. Additionally, the interface may display a table 1102 of the resulting proposed splits. Column 1103 of the table may show each of the parameters or attributes suggested by the algorithm as a potential candidate for splitting. For example, as shown in FIG. 11, the revolver score card score 1104 has been recommended by the next best split algorithm as a potential candidate for splitting.

Clicking the expansion interface element 1105 may display the proposed new nodes calculated by the next best split algorithm. In the example shown in FIG. 11, the algorithm has proposed splitting the "revolver scorecard score" attribute into three leaf node categories: scores of under 780 1106, scores between 780 and 800 1107 and other scores 1108.

Table 1102 may include further information that may assist the user in evaluating the various proposed splits. For example, column 1104 displays a predictive ranking indicating the quality of each of the various proposed splits. In the example shown in FIG. 11, column 1104 indicates that the "revolver scorecard score" split is better than either the "marital status" split or the "monthly disposable income" split.

Column 1105 displays the number of records that fall into each of the proposed subnodes for the split. For example, subnode 1106 would be associated with 2,195 records, subnode 1107 would be associated with 1,355 records, and subnode 1108 would be associated with 4,860 records. The information may be useful to a user in evaluating the quality and/or usefulness of a particular proposed split.

Column 1106 displays a calculated statistic or correlation indicating the quality of the splits. Statistical measures such as GINI, Chi-square, Omega-square, and so on, can be included to illustrate the improvement in predictive strength over the original segmentation. In an embodiment, multiple statistical measures can be displayed to the user as additional columns of data.

FIG. 12 shows a sample user interface of a decision tree after merging a selected split calculated by the next best split algorithm, as used in an embodiment. In the example shown in FIG. 12, the decision tree initially appeared as it does in FIG. 7, and then the user selected node 705 and performed a next best split analysis. Subsequently, after the interface of FIG. 11 was shown, the user selected the first split proposed in column 1104 to be merged into the existing decision tree, resulting in the tree shown in FIG. 12. Accordingly, node 705a shown in FIG. 12 now includes several leaf nodes as children, namely nodes 1201, 1202, and 1203.

In an embodiment, the user can merge the proposed splits into the existing decision tree with a single click or other command so that the proposed split automatically becomes part of the decision tree. Thus, the user can generate and/or add to existing decision trees or other structures through a tree-building process that is automated, with the flexibility to allow user customization where desired.

In another embodiment, the system automatically adds proposed split nodes to the tree without requiring further user interaction, thereby further increasing the automation of the software.

Figure 13:
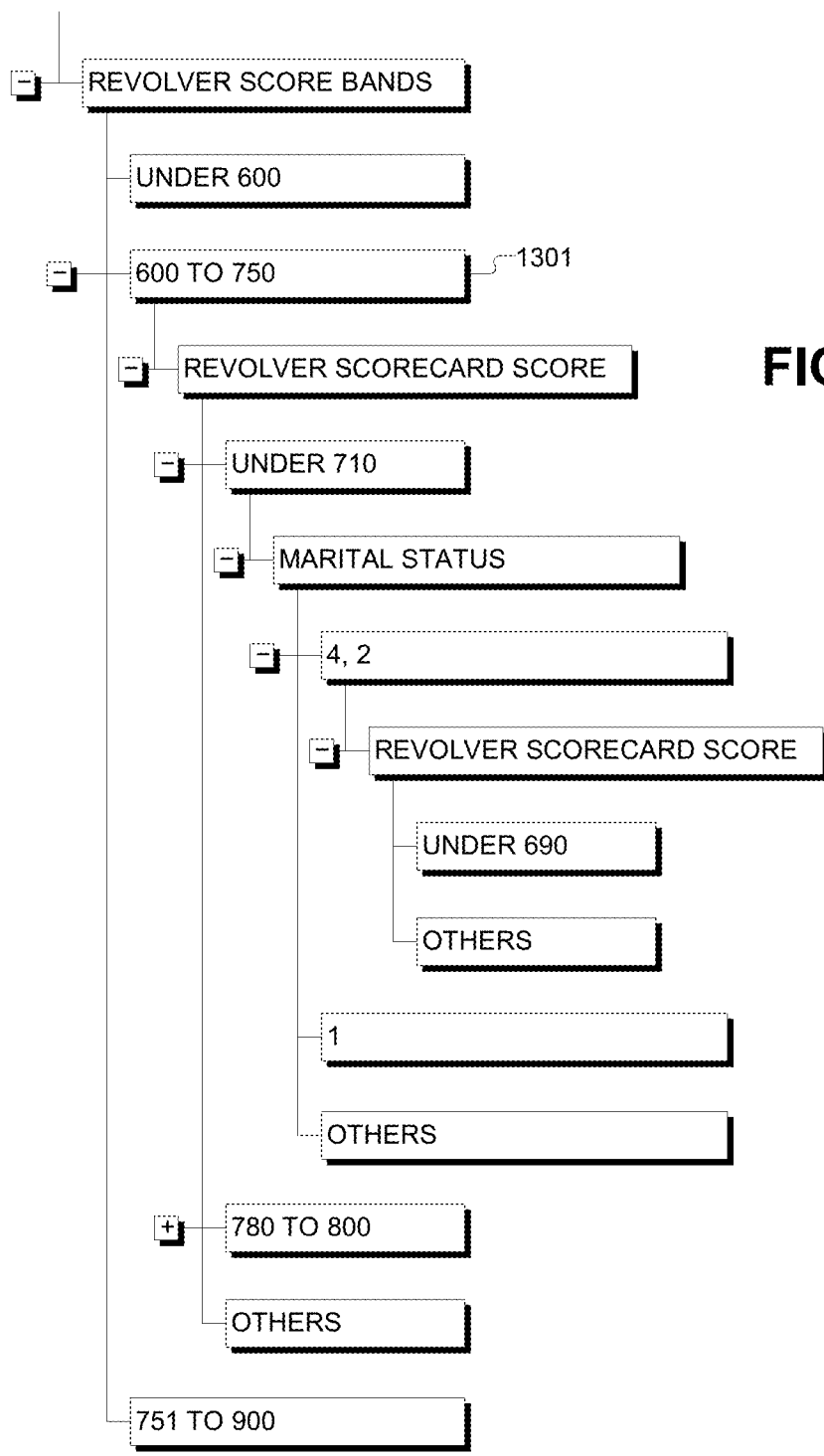
FIG. 13 illustrates another decision tree that has been grown, in an embodiment.

FIG. 13 illustrates another decision tree that has been grown by use of the "grow" option 903 of FIG. 9, in an embodiment. In this embodiment, the revolver score band node 1301 has been automatically grown to three further levels of nodes, based on the "revolver score card score" parameter, the "marital status" parameter, and further segmentation based on the "revolver score card score" parameter. The analysis may be automatically performed based on benchmark data, monitoring data, and/or any other data available to the system. Additionally, the user may provide inputs to the "grow" option, such as a number of splits to make per level, a number of levels to create, and one or more parameters to be optimized. These inputs are applied to the "grow" algorithm, which may be a simple variant of the "next best split" algorithm shown in FIG. 10 employing recursive splitting of nodes.

The "next best split" and "grow" options provide automated and assisted mechanisms for increasing the number of nodes in a decision tree, thereby improving the granularity and prediction power of the decision tree. However, the decision tree must also be able to determine appropriate outcomes for any particular leaf node. Accordingly, embodiments of the software provide functionality for automatically proposing outcomes for leaf nodes on the decision tree.

FIG. 14 is a flow chart of a process of automatically proposing outcomes for decision trees, as used in an embodiment. The process may be performed, by example, by a manager computer 101 shown in FIG. 1.

At block 1401, a selection of leaf nodes is received. The leaf nodes may be selected by the user, for example, by clicking on individual nodes and/or by clicking on a common parent to a set of nodes. Additionally and/or alternatively, the leaf nodes may be automatically selected when they are created, for example, by a next best split or grow operation. This may be the case, for example, where optional block 1007 of FIG. 10 is performed.

At block 1402, allocation rules and constraints are received to be used in automatically proposing outcomes. The allocation rules and constraints may include, for example, one or more parameters to the optimized or analyzed, and one or more parameters, associated with either particular outcomes or with the overall outcome, that are to be satisfied, optimized, or otherwise considered by the algorithm. Additionally, the allocation rules and constraints may include a selection of one or more algorithms to be used to calculate parameters such as forecast or prediction parameters. For example, if a user wishes to optimize or constrain a parameter of "predicted future spending," the user may be given the option to select an algorithm or formula for calculating predicted future spending. In an embodiment, the user may be able to specify a custom algorithm or formula by providing executable instructions or mathematical formulas to the user interface.

At block 1403, a set of outcomes for the selected leaf nodes is calculated. The calculation may be performed using artificial intelligence, optimization, statistical and/or heuristic algorithms based on the allocation rules and constraints received at block 1402 and/or data such as benchmark data, monitoring data, and/or other data.

Once the proposed outcomes have been calculated, they may optionally be proposed to the user at block 1404. This may be done, for example, by showing the user an appropriate user interface, such as a preview of the proposed outcomes on the decision tree. At block 1405, user input is received indicating whether the proposed outcomes are acceptable and/or indicating modifications to the proposed outcomes or the rules and constraints.

At block 1406, the software automatically applies the proposed outcomes, optionally with any user modifications made at block 1405, to the decision tree. In an embodiment where blocks 1404 and 1405 are not performed, the outcomes may be automatically applied to the tree once they have been calculated.

FIG. 15 is a sample user interface for specifying rules and constraints for the calculation of proposed best outcomes, as used in an embodiment. The user interface may be presented as a part of design pane 201 of FIG. 1, for example. The interface of FIG. 15 may be presented upon selection of the "proposed best outcomes" option 904 of FIG. 9, for example.

The user may be able to select parameters to be optimized, such as the sum of credit limits 1501. The user may further be able to indicate whether to maximize, minimize, or perform some other analysis of the measured parameter, at input element 1502.

Additionally, the user may be able to specify a set of constraints on the best outcomes calculation using table 1503. As shown there, the user may specify, for example, a maximum bad debt amount in column 1504 and/or a maximum credit limit amount 1505, for the overall calculation and/or for particular outcomes.

Additionally, the user may be able to specify which outcomes may be applied to the selected leaf nodes, using column 1506. Thus, as shown in the example of FIG. 15, the best outcomes calculation will attempt to maximize the sum of credit limits while ensuring that the "overall bad debts" total value remains under $10 million and the "overall credit limits" total value remains under $80 million.

Radio buttons 1507 enable the user to choose whether the "propose best outcomes" calculation assigns outcomes to all of the selected nodes or only nodes that currently have no outcome assigned. Thus, the user may be able to use the algorithm to improve upon an existing assignment of outcomes to nodes, or the user may be able to use the calculation with respect to newly created nodes, such as nodes generated by the next best split algorithm.

FIG. 16 is a sample user interface displaying proposed best outcomes, as used in an embodiment. The interface may be displayed, for example, at block 1404 of FIG. 14. It may be displayed in design pane 201 of FIG. 2, for example, so that the user interface shows the proposed decision tree rather than the existing decision tree. In an alternate embodiment, both the existing decision tree and the proposed decision tree may be shown side-by-side or in any other fashion.

The outcomes assigned by the "propose best outcomes" calculation may be shown in column 1601. In an embodiment, the outcomes that have been changed and/or added by the algorithm may be highlighted so that they may be easily found by the user. Additionally, informational statistics, such as the sum of credit limits for each of the nodes, may be shown in column 1602, and the sum of bad debt for each of the nodes may be shown in column 1603. These and other statistics that may be included may assist the user in evaluating whether any changes are required to the proposed outcome and/or to the overall decision tree.

In an embodiment, the user is easily able to view previous values by hovering a mouse cursor over an appropriate portion of the user interface and/or any other appropriate user interaction, as shown by box 1604.

The interface may further include a summary table 1605 of information about the proposed best outcomes. For example, the table may display the sum of credit limits for each of the outcomes in column 1606, and the sum of bad debts for each of the outcomes in column 1607. This information further enables the user to evaluate the assignment of outcome on the decision tree.

Buttons 1608 allow the user to apply the proposed outcome to the existing tree and/or to modify or cancel the proposed best outcomes. If the user wishes to apply the proposed best outcomes, then the decision tree is automatically updated with the proposed best outcomes as calculated.

SUMMARY

Depending on the embodiment, the systems and methods described with reference to the flowcharts and block diagrams, as well as any other methods discussed herein, may include fewer or additional blocks and/or the blocks may be performed or arranged in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing systems 101-102 of FIG. 1 and/or other computing devices illustrated in the Figures, in order to perform the respective methods. For ease of explanation, the methods have been described herein as performed by the various modules, such as may be executed on the computing systems 101-102, which should be interpreted to include any one or more of the computing devices noted above and/or any other suitable computing device.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing devices described herein and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
one or more computer processors;
a computer-readable memory having stored thereon a plurality of executable instructions configured to be executed on the one or more computer processors to perform operations comprising:
obtaining information describing process steps included in a user-defined process flow, with one or more of the process steps being associated with a corresponding one or more decision trees usable to determine information associated with a consumer based on inputs describing parameters of the consumer;
providing, for presentation to a user, a graphical user interface depicting a decision tree comprising:
a plurality of nodes including a plurality of decision nodes and a plurality of leaf nodes;
wherein each decision node is associated with one or more leaf nodes, and each of the leaf nodes is associated with different value ranges of a parameter of consumers associated with the particular decision node;
receiving, from a user, user interaction requesting a next best split of a selected leaf node associated with a selected consumer parameter;
in response to the next best split request:
automatically, by the computing device, identifying a plurality of parameters of consumers usable to further segment consumers associated with the selected leaf node;
identifying, for each of the identified plurality of parameters, one or more leaf nodes associated with different value ranges of the respective parameter;
providing, for presentation to the user, an indication of the identified plurality of parameters as possible split decision nodes, including statistical parameters indicating respective rankings of the possible split decision nodes, wherein the rankings of the possible split decision nodes are determined automatically by the computing device;
receiving user input selecting a first of the possible split decision nodes to be merged into the decision tree;
incorporating, into the decision tree, the selected first possible decision node and the identified one or more leaf nodes associated with the selected first possible decision node
receiving user input associated with calculating proposed outcomes for association with the leaf nodes, the user input indicating constraints to be optimized; and
determining, based on the constraints, associations between proposed outcomes and leaf nodes,
wherein the updated decision tree is usable to segment consumers and determine associated outcomes for the consumers.

2. The computer system of claim 1, wherein receiving user interaction requesting a next best split comprises:
receiving information indicating the user clicking on a portion of the decision tree, the portion associated with the selected leaf node.

3. The computer system of claim 1, wherein identifying parameters usable to further segment consumers associated with the selected leaf node comprises:
identifying the parameters based on one or more split parameters identifying parameters of consumers to be optimized.

4. The computer system of claim 3, wherein the one or more parameters to be optimized include a variable to be optimized, and wherein the statistical parameters are calculated based on the variable to be optimized.

5. The computer system of claim 1, wherein providing an indication of the identified plurality of parameters as possible split decision nodes comprises dynamically displaying each possible split decision node and associated statistical information.

6. The computer system of claim 1, wherein the operations further comprise:
maintaining monitoring data, for later review by users, describing each possible split decision node including leaf nodes associated with the possible split decision node and statistical parameters for the possible split decision node.

7. A computer-implemented method comprising:
obtaining information describing process steps included in a user-defined process flow, with one or more of the process steps being associated with a corresponding one or more decision trees usable to determine information associated with a consumer based on inputs describing parameters of the consumer;
providing, for presentation to a user, a graphical user interface depicting a decision tree comprising:
a plurality of nodes including a plurality of decision nodes and a plurality of leaf nodes;
wherein each decision node is associated with one or more leaf nodes, and wherein and each of the leaf nodes is associated with different value ranges of a parameter of consumers associated with the particular decision node;
receiving, from a user, user interaction requesting a next best split of a selected leaf node associated with a selected consumer parameter;
in response to the next best split request:
automatically, by the computing device, identifying a plurality of parameters of consumers usable to further segment consumers associated with the selected leaf node;
identifying, for each of the identified plurality of parameters, one or more leaf nodes associated with different value ranges of the respective parameter;

providing, for presentation to the user, an indication of the identified plurality of parameters as possible split decision nodes, including statistical parameters indicating respective rankings of the possible split decision nodes, wherein the rankings of the possible split decision nodes are determined automatically by the computing device;

receiving user input selecting a first of the possible split decision nodes to be merged into the decision tree;

incorporating, into the decision tree, the selected first possible decision node and the identified one or more leaf nodes associated with the selected first possible decision node receiving user input associated with calculating proposed outcomes for association with the leaf nodes, the user input indicating constraints to be optimized; and determining, based on the constraints, associations between proposed outcomes and leaf nodes, wherein the updated decision tree is usable to segment consumers and determine associated outcomes for the consumers.

8. The computer-implemented method of claim 7, wherein receiving user interaction requesting a next best split comprises:

receiving information indicating the user clicking on a portion of the decision tree, the portion associated with the selected leaf node.

9. The computer-implemented method of claim 7, wherein identifying parameters usable to further segment consumers associated with the selected leaf node comprises:

identifying the parameters based on one or more split parameters identifying parameters of consumers to be optimized.

10. The computer-implemented method of claim 9, wherein the one or more parameters to be optimized include a variable to be optimized, and wherein the statistical parameters are calculated based on the variable to be optimized.

11. The computer-implemented method of claim 7, wherein providing an indication of the identified plurality of parameters as possible split decision nodes comprises dynamically displaying each possible split decision node and associated statistical information.

12. The computer-implemented method of claim 7, further comprising:

maintaining monitoring data, for later review by users, describing each possible split decision node including leaf nodes associated with the possible split decision node and statistical parameters for the possible split decision node.

* * * * *